United States Patent
Isozaki et al.

(10) Patent No.: US 11,232,044 B2
(45) Date of Patent: *Jan. 25, 2022

(54) DATA STORAGE APPARATUS, DATA PROCESSING SYSTEM, AND DATA PROCESSING METHOD

(71) Applicant: Toshiba Memory Corporation, Minato-ku (JP)

(72) Inventors: Hiroshi Isozaki, Kawasaki (JP); Koichi Nagai, Tokyo (JP)

(73) Assignee: Toshiba Memory Corporation, Minato-ku (JP)

( * ) Notice: Subject to any disclaimer, the term of this patent is extended or adjusted under 35 U.S.C. 154(b) by 279 days.

This patent is subject to a terminal disclaimer.

(21) Appl. No.: 16/662,656

(22) Filed: Oct. 24, 2019

(65) Prior Publication Data
US 2020/0057733 A1 Feb. 20, 2020

Related U.S. Application Data

(63) Continuation of application No. 16/004,962, filed on Jun. 11, 2018, now Pat. No. 10,509,735.

(30) Foreign Application Priority Data

Jan. 30, 2018 (JP) .............................. JP2018-014045

(51) Int. Cl.
*G06F 12/14* (2006.01)
*G06F 3/06* (2006.01)
*G06F 21/62* (2013.01)

(52) U.S. Cl.
CPC ........ *G06F 12/1458* (2013.01); *G06F 3/0622* (2013.01); *G06F 3/0637* (2013.01);
(Continued)

(58) Field of Classification Search
CPC .. G06F 12/1458; G06F 12/14; G06F 12/1404; G06F 3/0622; G06F 3/0637;
(Continued)

(56) References Cited

U.S. PATENT DOCUMENTS 7,007,304 B1 * 2/2006 Girard .................... G06F 21/79
726/30
9,626,531 B2 4/2017 Natarajan et al.
(Continued)

FOREIGN PATENT DOCUMENTS

JP 2006-172351 6/2006
JP 5380604 B2 1/2014
(Continued)

OTHER PUBLICATIONS

Trusted Computing Group, "TCG Storage Architecture Core Specification", (Specification Version 2.01, Revision 1.00), downloaded from: https://trustedcomputinggroup.org/wp-content/uploads/TCG_Storage_Architecture_Core_Spec_v2.01_r1.00.pdf, Aug. 5, 2015, 306 pages.
(Continued)

*Primary Examiner* — Michael Krofcheck
(74) *Attorney, Agent, or Firm* — Oblon, McClelland, Maier & Neustadt, L.L.P.

(57) ABSTRACT

According to one embodiment, a data storage apparatus includes a controller with a data protection function. The controller manages first and second personal identification data. The first personal identification data only includes authority to request inactivation of the data protection function. The second personal identification data includes authority to request inactivation of the data protection function and activation of the data protection function. The controller permits setting of the first personal identification data, when the second personal identification data is used for
(Continued)

successful authentication and the first personal identification data is an initial value, or when the data protection function is in an inactive state.

9 Claims, 26 Drawing Sheets

(52) U.S. Cl.
CPC .......... *G06F 3/0658* (2013.01); *G06F 3/0659* (2013.01); *G06F 3/0673* (2013.01); *G06F 21/6245* (2013.01); *G06F 2212/1052* (2013.01)

(58) Field of Classification Search
CPC .... G06F 3/0658; G06F 3/0659; G06F 3/0673; G06F 21/6245; G06F 21/60; G06F 21/6218; G06F 21/78; G06F 21/80; G06F 21/62; G06F 2212/1052
See application file for complete search history.

(56) References Cited

U.S. PATENT DOCUMENTS

| | | | |
|---|---|---|---|
| 9,756,033 B2 | 9/2017 | Isozaki | |
| 2007/0192557 A1 | 8/2007 | Kezuka | |
| 2008/0059743 A1* | 3/2008 | Bychkov | G06F 21/78 711/163 |
| 2008/0229100 A1* | 9/2008 | Trodden | G06F 21/10 713/161 |
| 2012/0260349 A1 | 10/2012 | Nagai | |
| 2012/0278579 A1* | 11/2012 | Goss | G06F 12/0246 711/166 |
| 2013/0024679 A1 | 1/2013 | Isozaki | |
| 2013/0198853 A1 | 8/2013 | McKeen | |
| 2014/0026232 A1* | 1/2014 | Lee | G06F 21/78 726/30 |
| 2014/0157006 A1* | 6/2014 | Kim | G06F 21/64 713/193 |
| 2014/0298026 A1 | 10/2014 | Isozaki | |
| 2015/0082053 A1 | 3/2015 | Sano | |
| 2015/0082399 A1 | 3/2015 | Wu | |
| 2016/0080147 A1 | 3/2016 | Kato | |
| 2016/0140364 A1 | 5/2016 | Natarajan | |
| 2016/0212129 A1 | 7/2016 | Johnston et al. | |
| 2019/0087113 A1 | 3/2019 | Isozaki et al. | |

FOREIGN PATENT DOCUMENTS

| | | |
|---|---|---|
| JP | 2016-535902 | 11/2016 |
| JP | 2019-57165 A | 4/2019 |

OTHER PUBLICATIONS

Trusted Computing Group, "TCG Storage Opal SSC Feature Set: PSID", (Specification Version 1.00, Revision 1.00) downloaded from: https://trustedcomputinggroup.org/wp-content/uploads/TCG_Storage-Opal_Feature_Set_PSID_v1.00_r1.00.pdf, Aug. 5, 2015, 13 pages.

Trusted Computing Group, "TCG Storage Security Subsystem Class: Opal", (Specification Version 2.01, Revision 1.00), downloaded from: https://trustedcomputinggroup.org/storage-work-group-storage-security-subsystem-class-opal/. Aug. 5, 2015, 80 pages.

Trusted Computing Group, "TCG Storage Security Subsystem Class: Pyrite", (Specification Version 1.00, Revision 1.00) downloaded from: https://trustedcomputinggroup.org/tcg-storage-security-subsystem-class-pyrite/, Aug. 5, 2015, 62 pages.

* cited by examiner

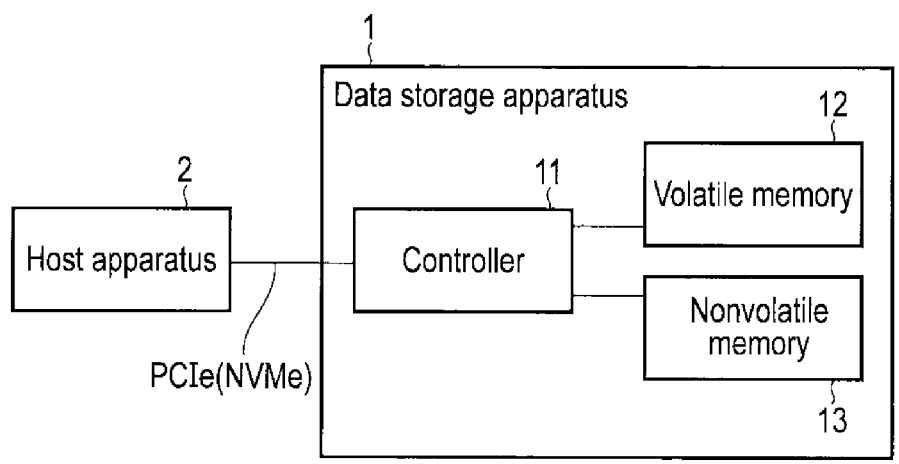
F I G. 1

| PIN type |
|---|
| SID(Owner PIN) |
| Admin(Administrator[Admin]PIN) |
| User(User PIN) |
| PSID(Label PIN) |
| LSID — a1 |
| MSID |

F I G. 3

| Command | Authority |
|---|---|
| Activate | SID |
| Revert | SID,PSID,LSID — b1 |
| Set | Dependence on object |
| Get | Dependence on object |

F I G. 4

| Object(PIN type) | Authority of Set | Authority of Get |
|---|---|---|
| SID | SID | — |
| Admin | Admin | — |
| User | Admin,User (Corresponding user only) | — |
| PSID | — | — |
| LSID (c1) | SID | — |
| MSID | — | Anybody |

— Issuable under certain condition

F I G. 5

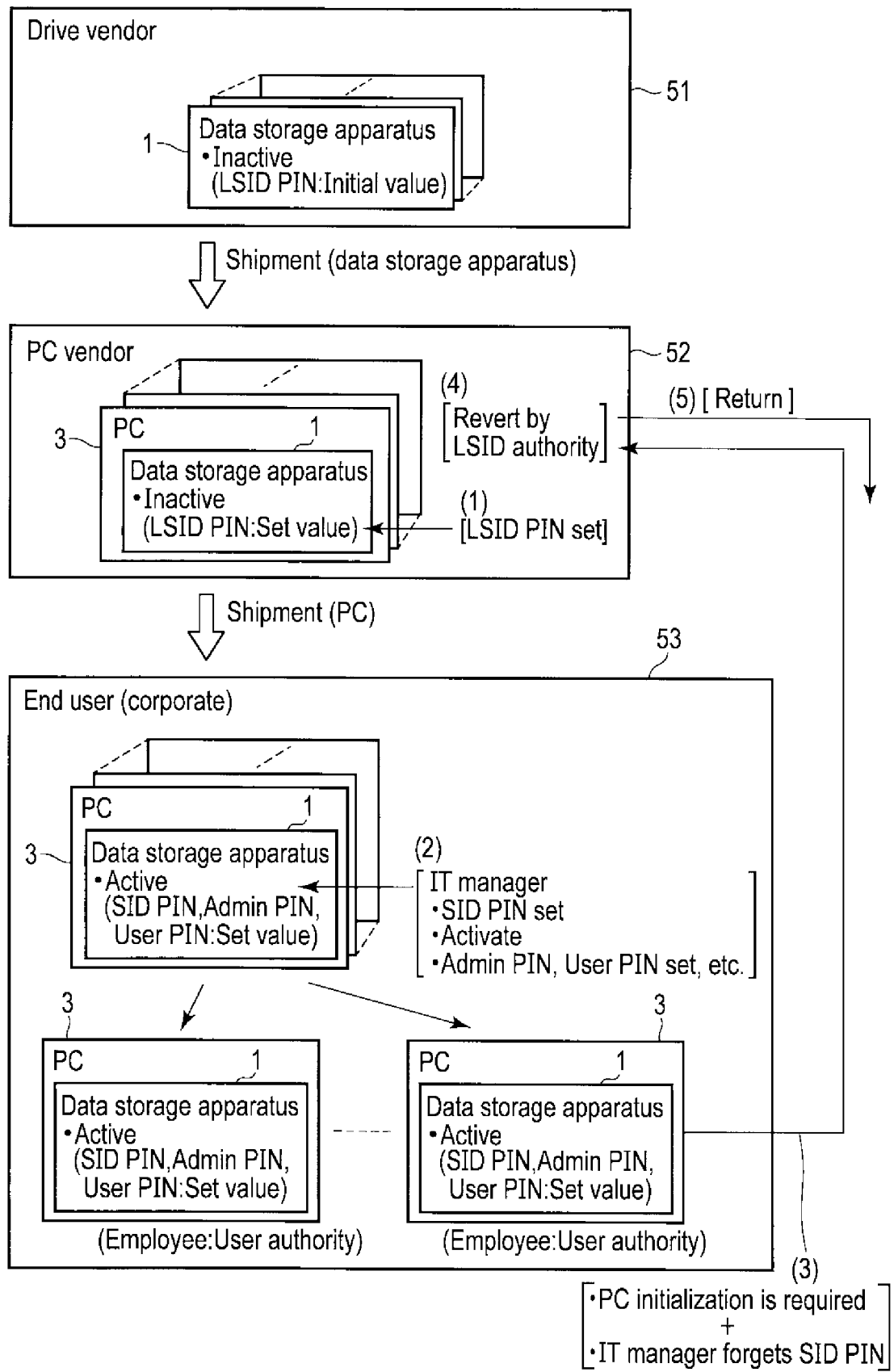
F I G. 7

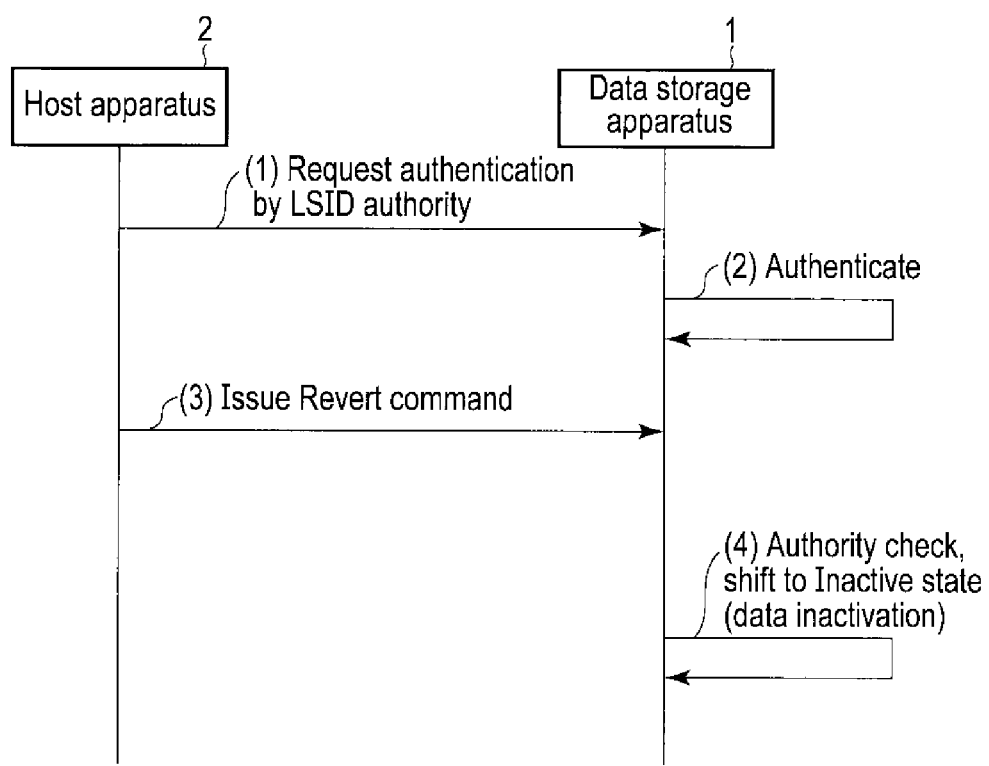
F I G. 10

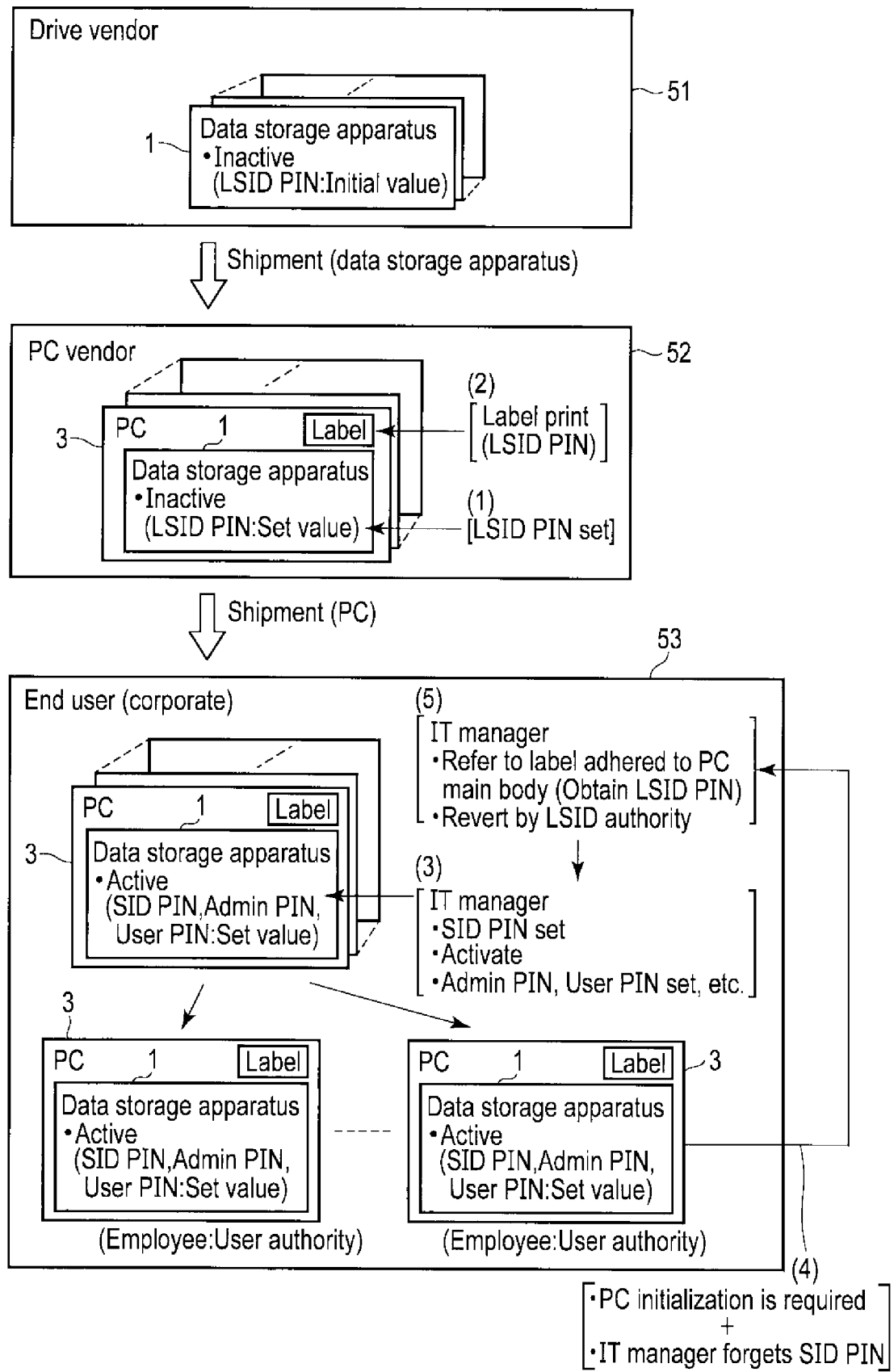
F I G. 14

| Command | Authority |
|---|---|
| Activate | SID |
| Revert | SID,PSID,LSID —— b1 |
| Set | Dependence on Object |
| Get | Dependence on Object |
| b2 —— Gen_LSID | SID |

F I G. 16

| Object(PIN type) | Authority of Set | Authority of Get |
|---|---|---|
| SID | SID | —— |
| Admin | Admin | —— |
| User | Admin,User(Corresponding user only) | —— |
| PSID | —— | —— |
| c1 —— LSID | —— | SID ◀—— c2 |
| MSID | —— | Anybody |

Issuable under certain condition

F I G. 17

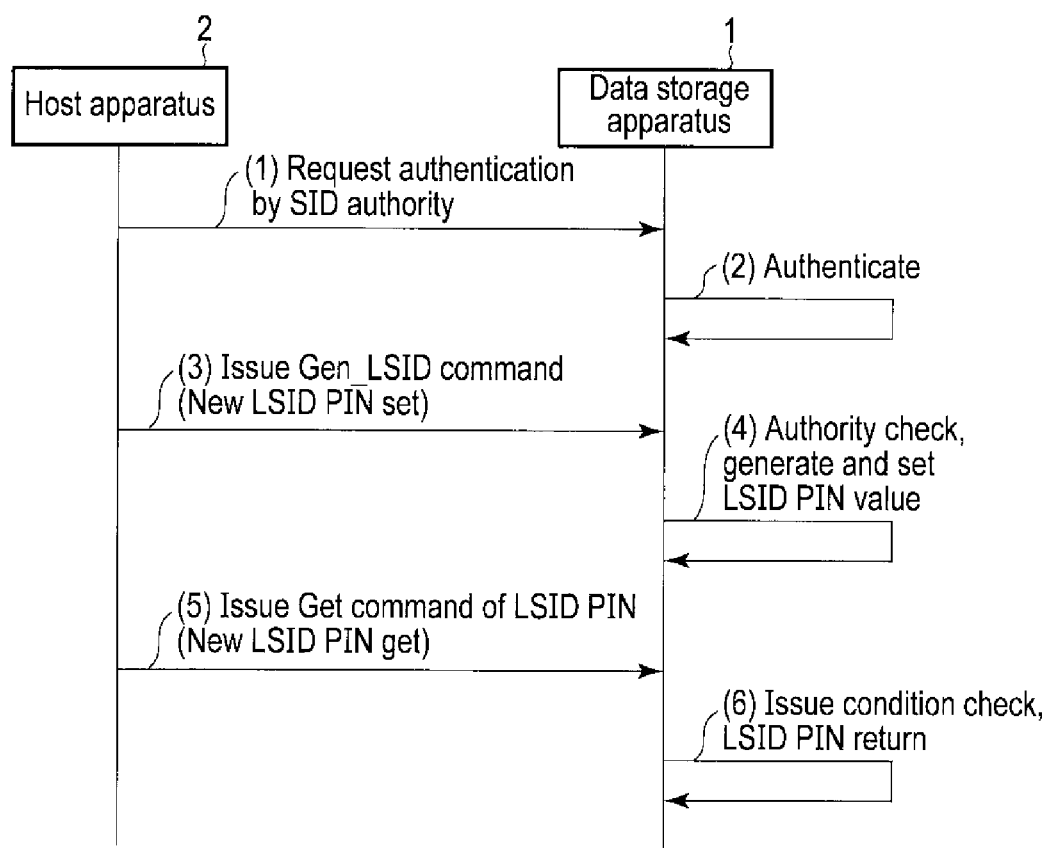
F I G. 18

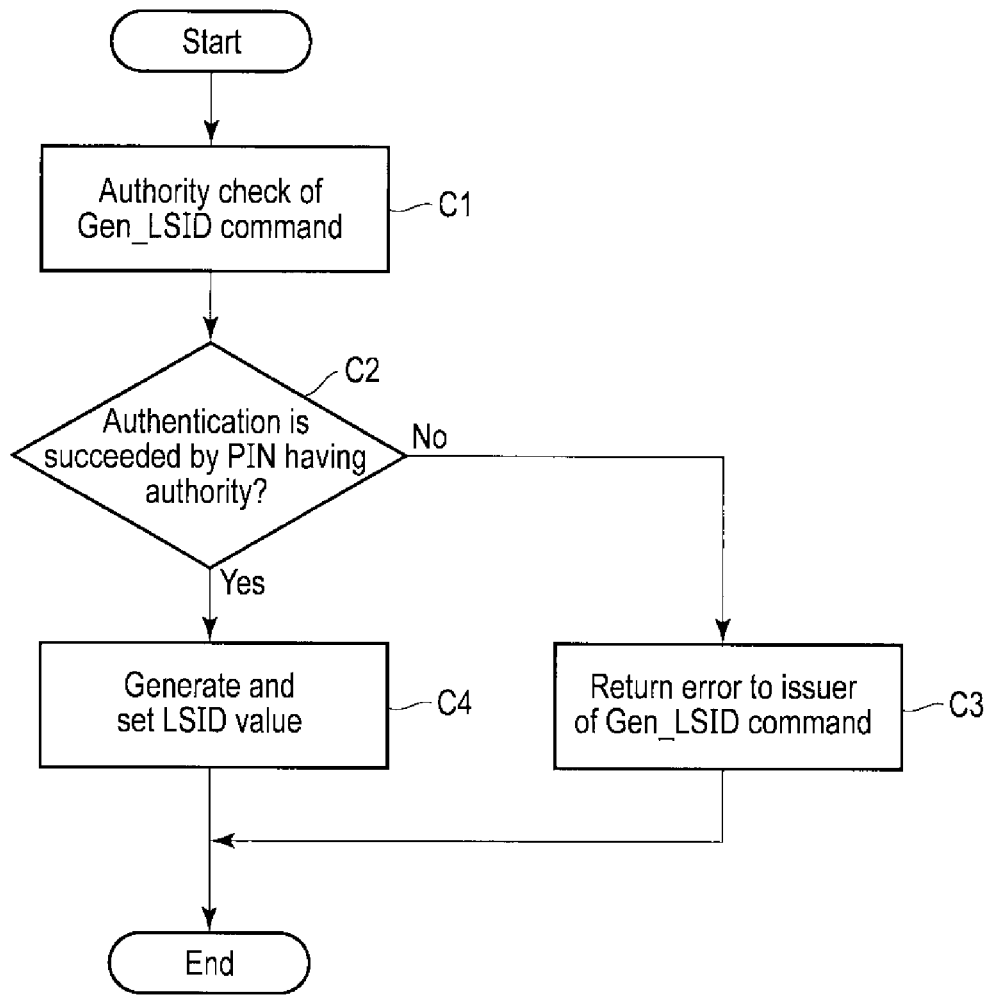
F I G. 19

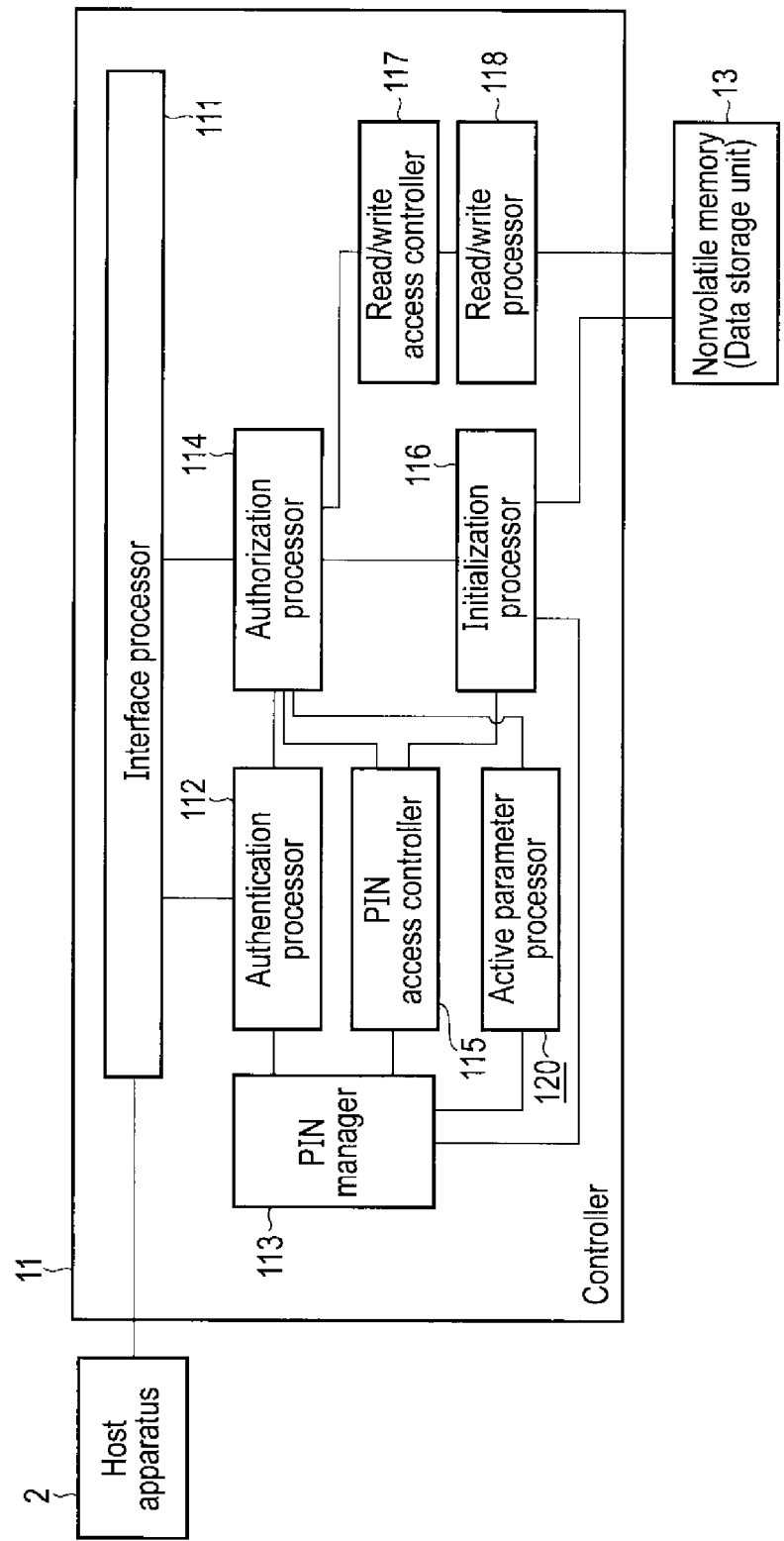
F I G. 21

| Command | Authority |
|---|---|
| Activate | SID |
| Activate(w/param) — b3 | SID |
| Revert | SID,PSID,LSID — b1 |
| Set | Dependence on Object |
| Get | Dependence on Object |
F I G. 22
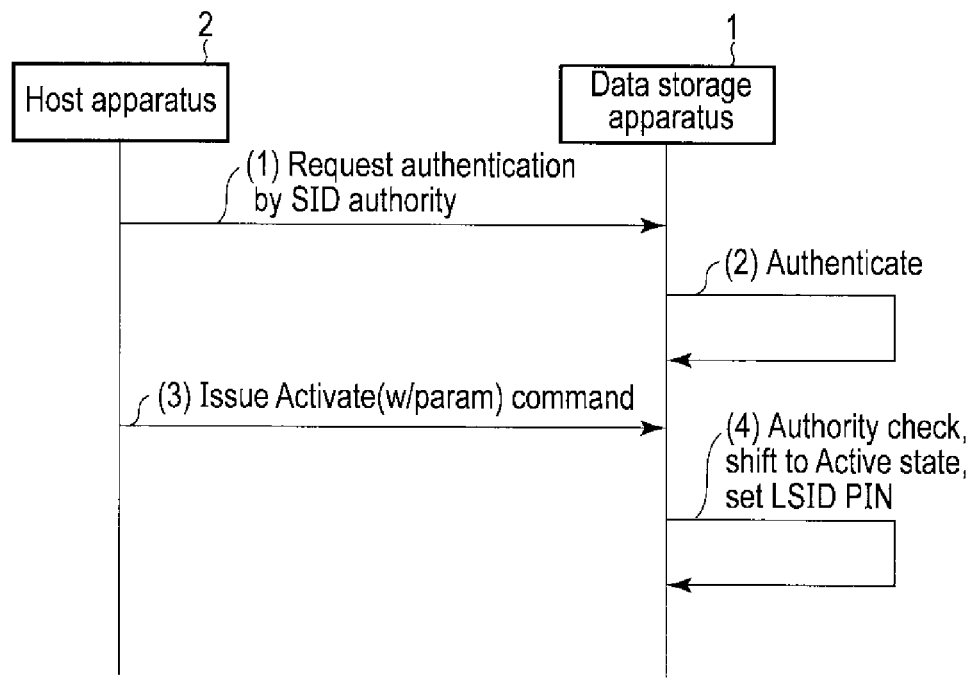
F I G. 23

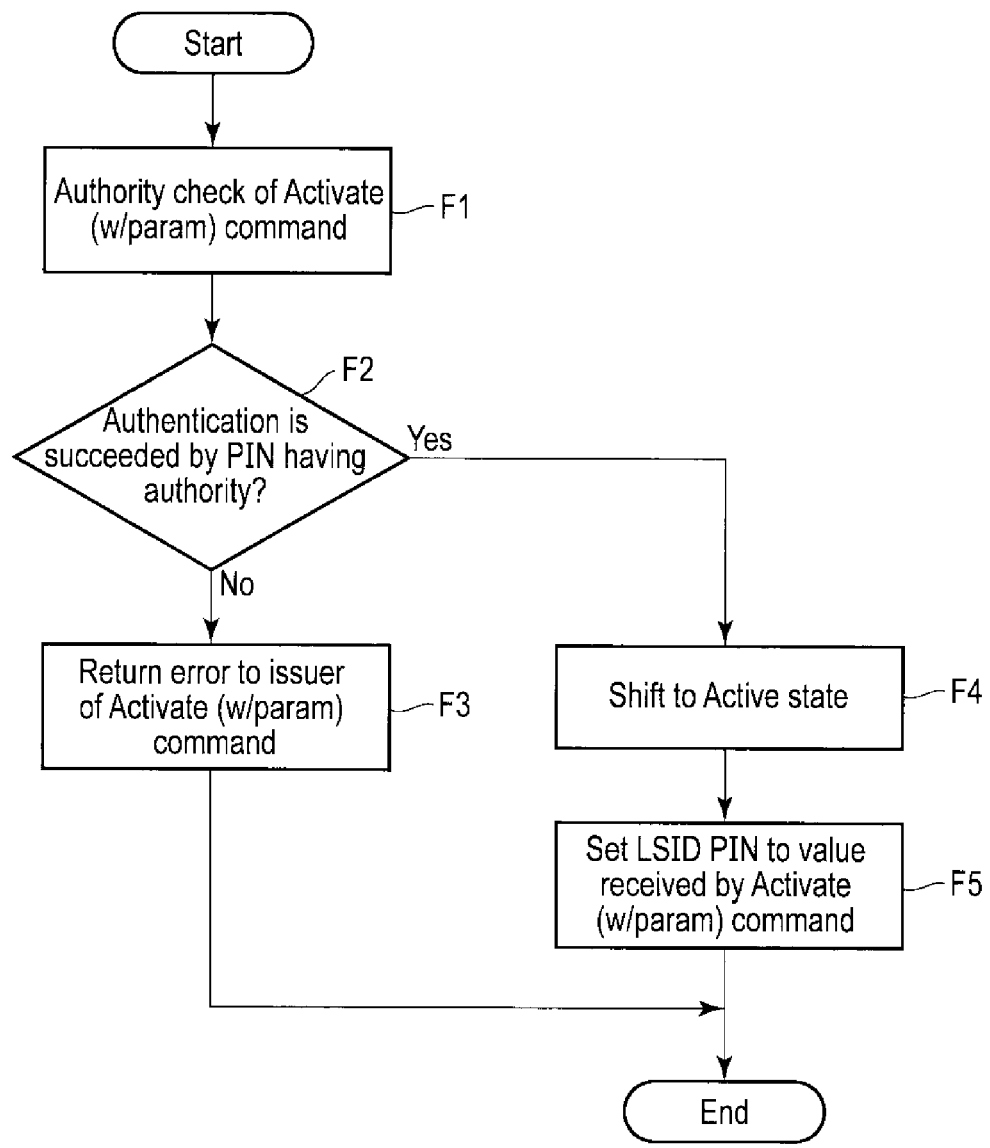
F I G. 24

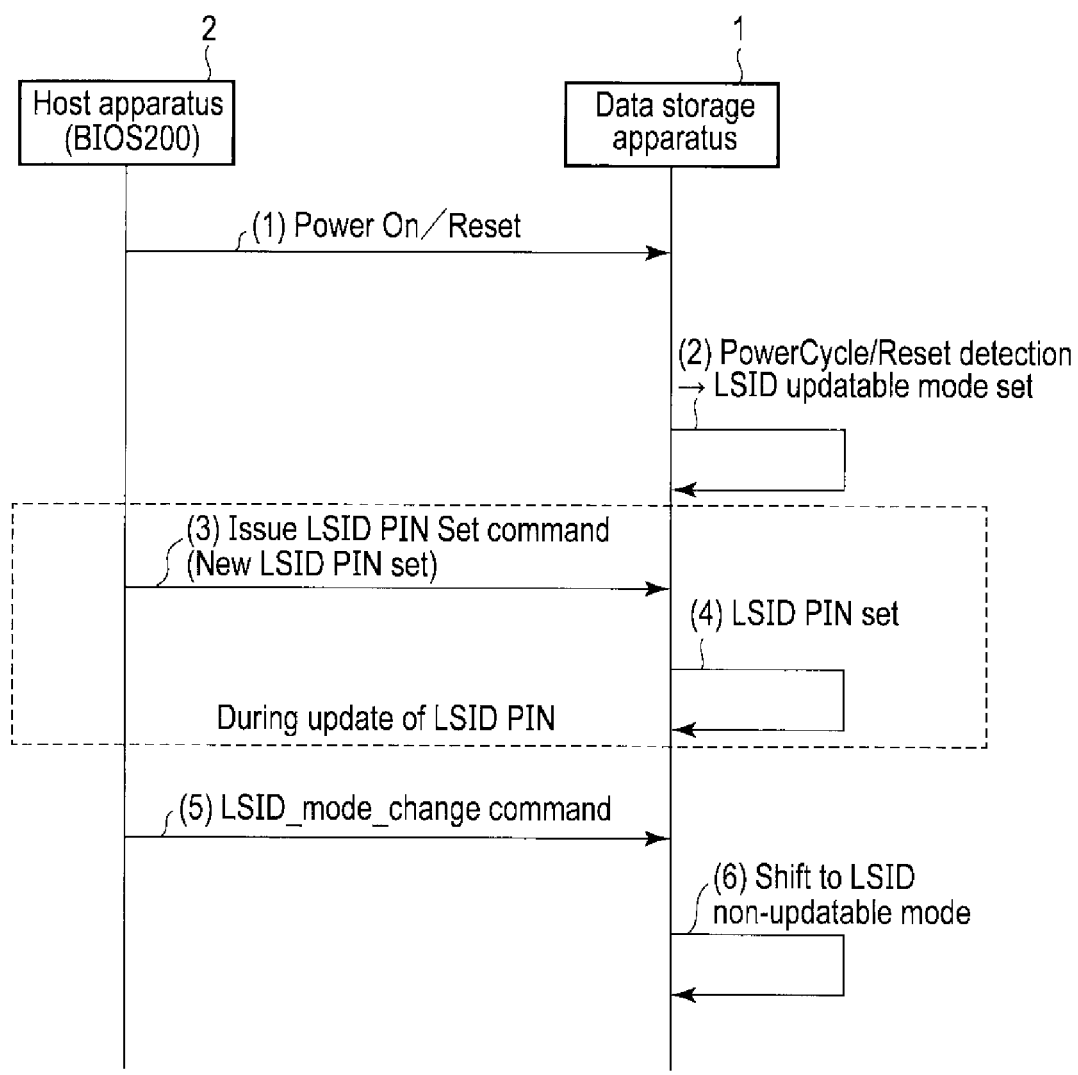
F I G. 26

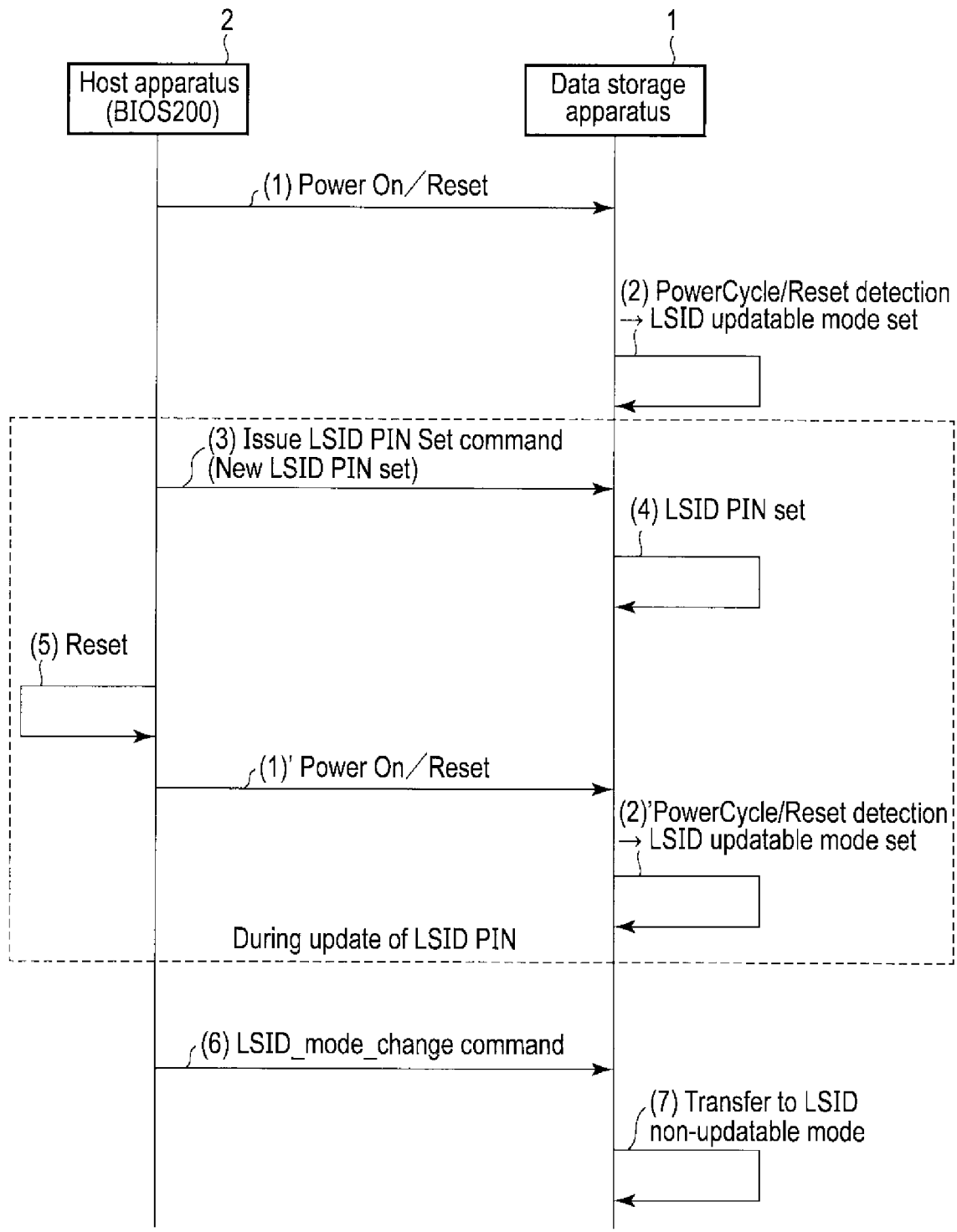
F I G. 27

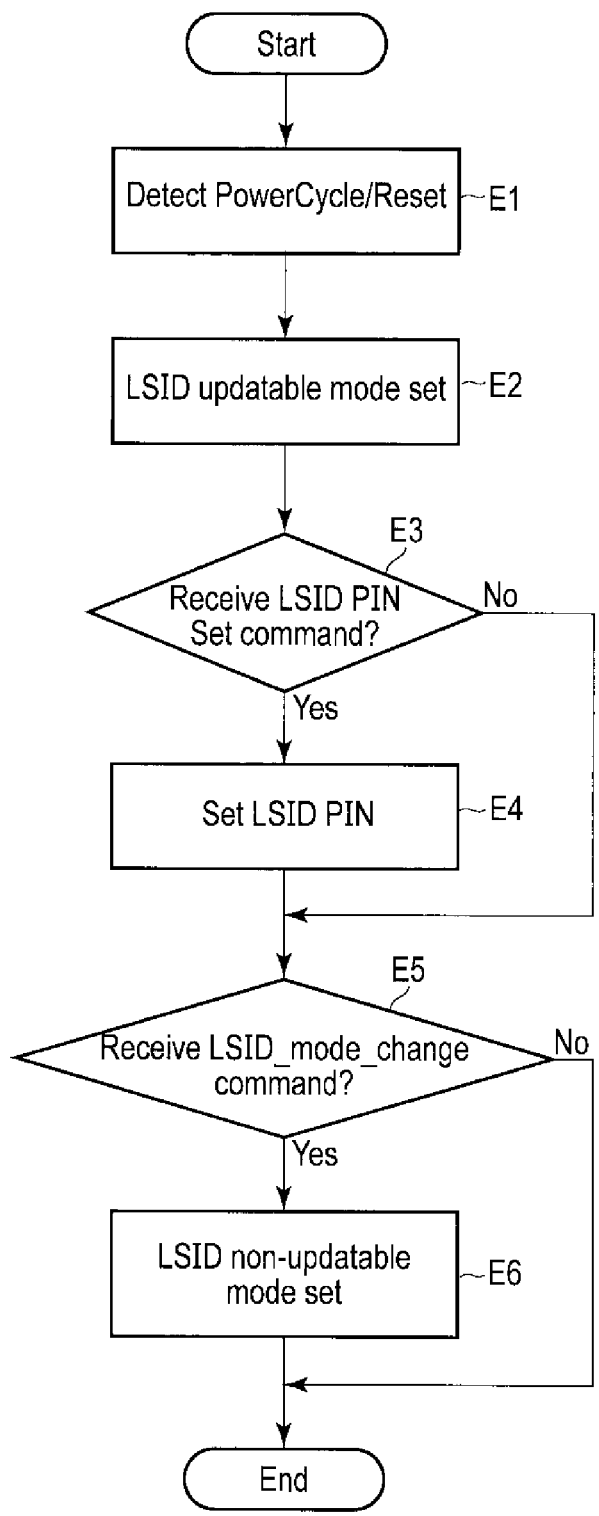
F I G. 28

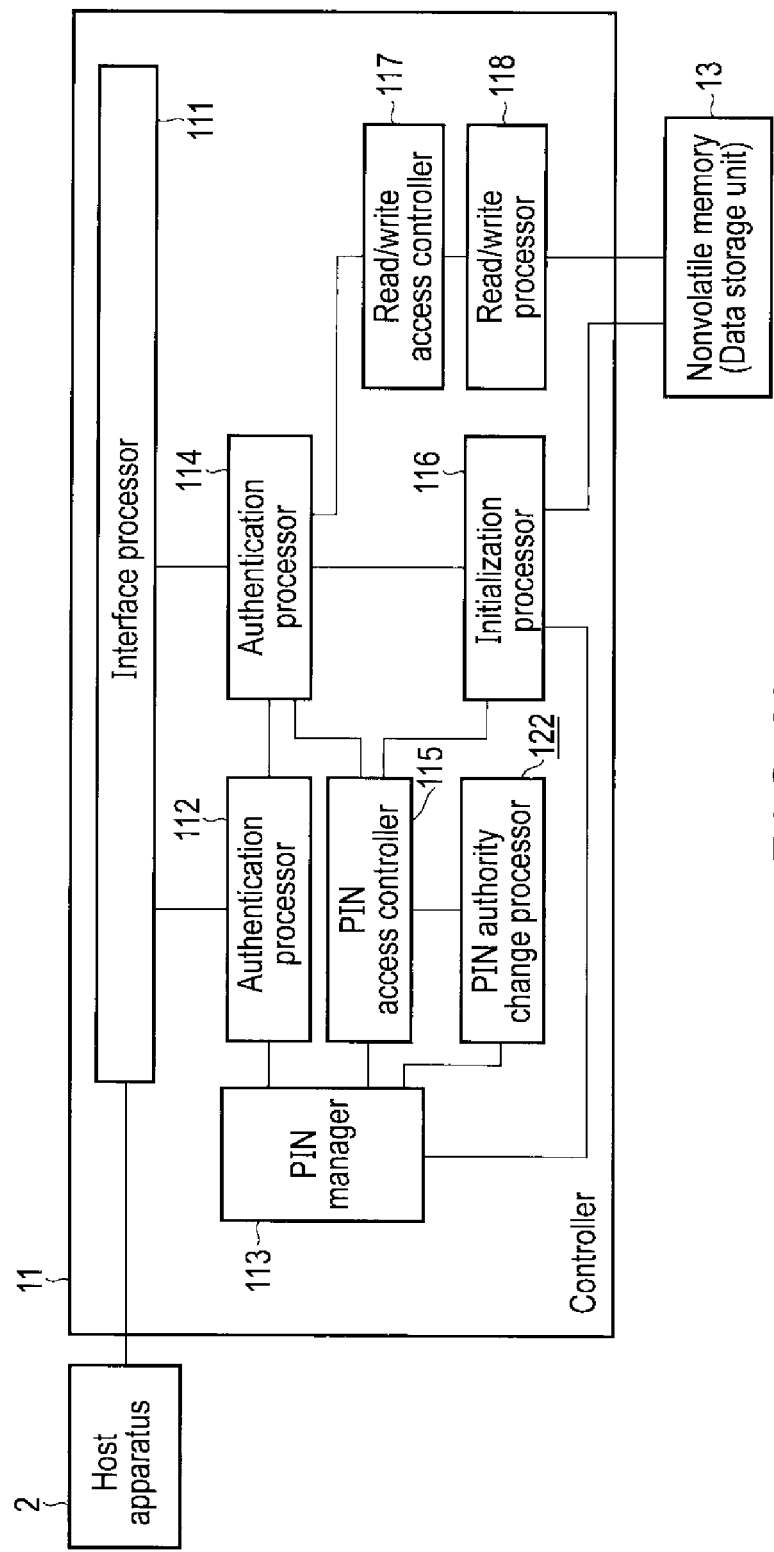
F I G. 29

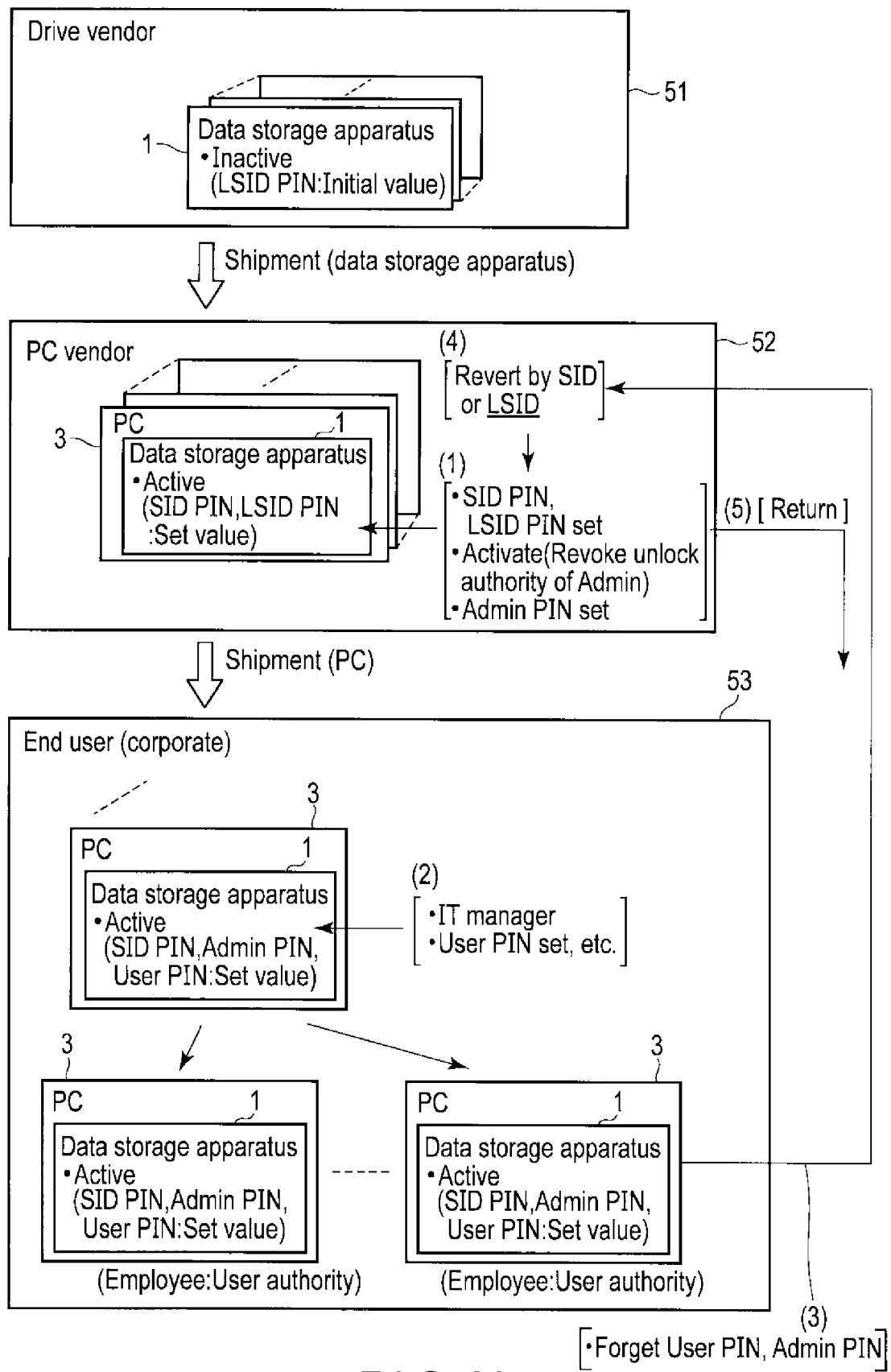
F I G. 30

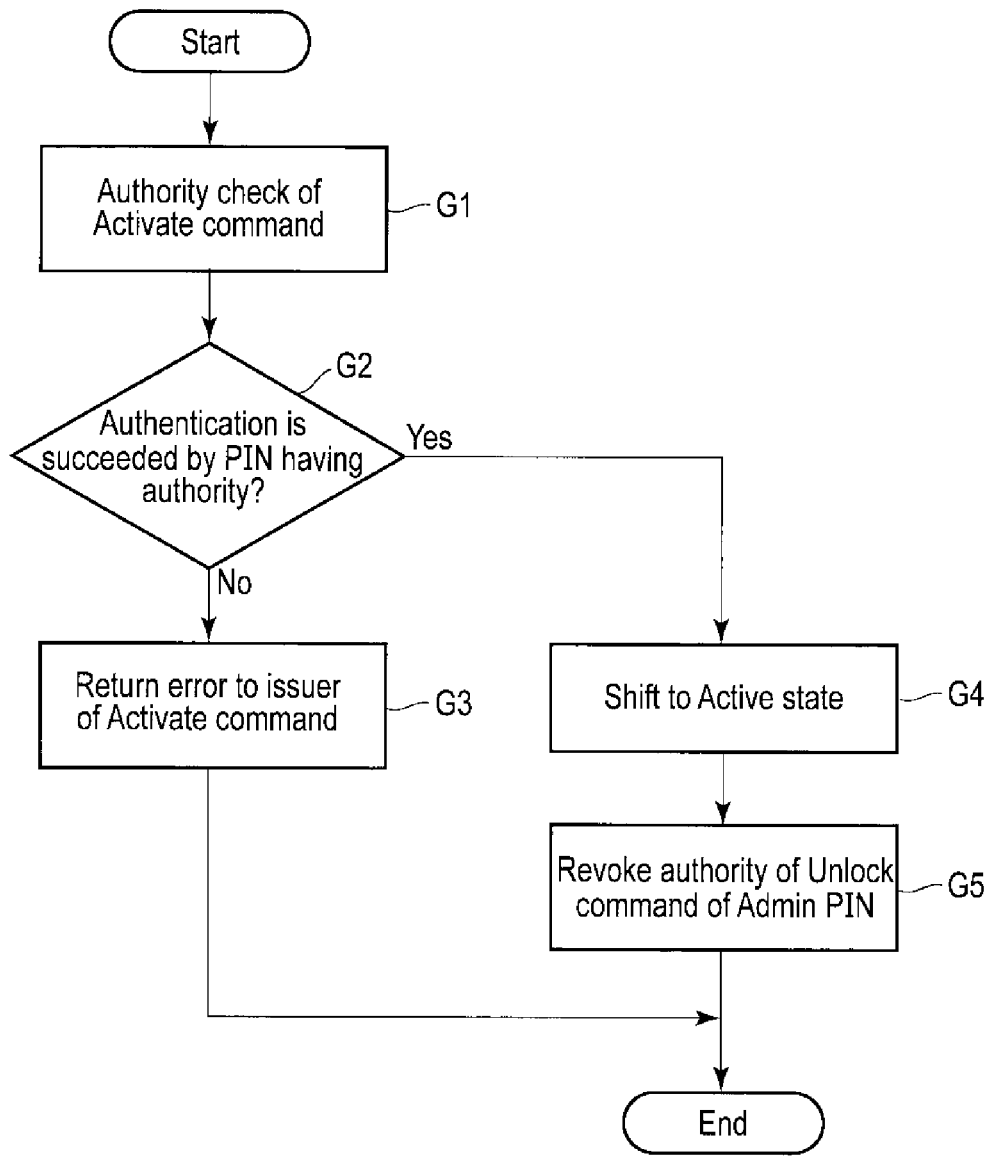
F I G. 31

DATA STORAGE APPARATUS, DATA PROCESSING SYSTEM, AND DATA PROCESSING METHOD

CROSS-REFERENCE TO RELATED APPLICATIONS

This application is a continuation of U.S. application Ser. No. 16/004,962 filed Jun. 11, 2018, which is based upon and claims the benefit of priority from Japanese Patent Application No. 2018-014045, filed Jan. 30, 2018, the entire contents of each of which are incorporated herein by reference.

FIELD

Embodiments described herein relate generally to a data storage apparatus, data processing system, and data processing method.

BACKGROUND

In recent years, prevention of leakage of data is widely concerned. Thus, data storage apparatuses with a data protection function for preventing invalid data reading etc., are now used.

In general, the data storage apparatus including a data protection function manages personal identification data such as personal identification number (PIN) and authenticates a person using the personal identification data. Data read and the like are authorized only for a person who succeeds with the authentication.

In some cases, in consideration of a case where a righteous user forgets the personal identification data, personal identification data having authority to perform initialization in which data are invalidated and the data protection function is inactivated may be prepared. This personal identification data has no authority to read data. Here, the inactivation of data protection function means that the data protection function is shifted to a non-operation state from an operation state. Shift of the data protection function from the non-operation state to the operation state will be referred to as activation of data protection function. Such personal identification data for initialization strongly require secrecy to invalid users and protection to malicious setting by invalid users.

BRIEF DESCRIPTION OF THE DRAWINGS

FIG. 1 is a diagram showing an example of the structure of a data storage apparatus according to a first embodiment.

FIG. 3 is a diagram showing an example of types of PIN managed by the data storage apparatus according to the first embodiment.

FIG. 4 is a diagram showing an example of commands related to LSID (PIN) and authorities to issue the commands of the data storage apparatus according to the first embodiment.

FIG. 5 is a diagram showing shows an example of authorities of issuance of commands to set or get PIN of the data storage apparatus according to the first embodiment.

FIG. 7 is a diagram showing a first use case of the data storage apparatus according to the first embodiment.

FIG. 10 is a diagram showing a sequence of communication between the host device and the data storage apparatus in a case where initialization is performed by LSID PIN of the data storage apparatus according to the first embodiment.

FIG. 14 is a diagram showing a third use case of the data storage apparatus according to the first embodiment.

FIG. 16 is a diagram showing an example of commands related to LSID and authorities to issue the commands in the data storage apparatus according to the second embodiment.

FIG. 17 is a diagram showing an example of authorities to issue commands to set or obtain PIN in the data storage apparatus according to the second embodiment.

FIG. 18 is a diagram showing a sequence of communication between the host device and the data storage apparatus in a case where LSID PIN is updated in the data storage apparatus according to the second embodiment.

FIG. 19 is a flowchart showing an operation of the data storage apparatus according to the second embodiment when a Gen_LSID command is received.

FIG. 21 is a diagram showing an example of a functional block of a controller of a data storage apparatus according to a third embodiment.

FIG. 22 is a diagram showing an example of commands related to LSID and authorities to issue the commands of the data storage apparatus according to the third embodiment.

FIG. 23 is a diagram showing a sequence of communication between the host device and the data storage apparatus in a case where LSID PIN is set (updated) in the data storage apparatus according to the third embodiment.

FIG. 24 is a flowchart showing an operation of the data storage apparatus according to the third embodiment when an Activate (w/param) command is received.

FIG. 26 is a diagram showing a sequence of communication of first pattern between the host device and the data storage apparatus of the fourth embodiment when an LSID non-updatable mode is set.

FIG. 27 is a diagram showing a sequence of communication of second pattern between the host device and the data storage apparatus according to the fourth embodiment when an LSID non-updatable mode is set.

FIG. 28 is a flowchart showing an operation of the data storage apparatus according to the fourth embodiment for setting a mode related to update/non-update of LSID.

FIG. 29 is a diagram showing an example of a functional block of a controller of a data storage apparatus according to a fifth embodiment.

FIG. 30 is a diagram showing a use case (sixth use case) of the data storage apparatus according to the fifth embodiment.

FIG. 31 is a flowchart showing an operation of the data storage apparatus according to the fifth embodiment when an Activate command is received.

DETAILED DESCRIPTION

Figure 2:
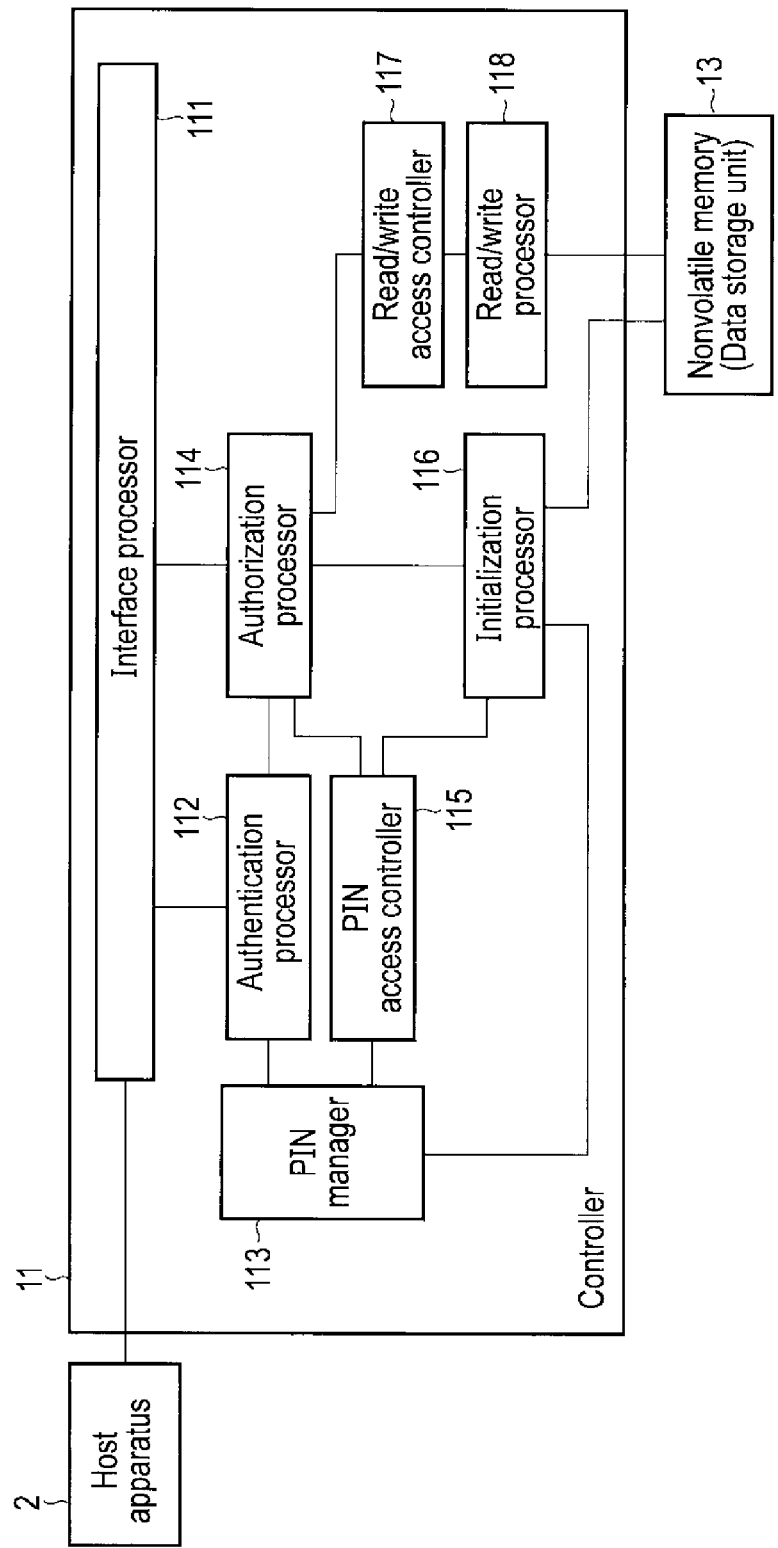
FIG. 2 is a diagram showing an example of a functional block of a controller of the data storage apparatus according to the first embodiment.

In general, according to one embodiment, a data storage apparatus includes a nonvolatile memory and a controller. The controller is configured to control data write and data read to/from the nonvolatile memory corresponding to a command from a host apparatus. The controller includes a data protection function for prohibiting the data write and the data read to/from an area of the nonvolatile memory allocated as a user area and for invalidating data on the nonvolatile memory to prevent leakage of data on the nonvolatile memory. The controller includes a personal identification data manager, a personal identification data access controller, an initialization processor and an authorization processor. The personal identification data manager is configured to manage first personal identification data with second personal identification data or third personal identification data. The first personal identification data only includes authority to request inactivation of the data protection function to invalidate the data on the nonvolatile memory and to shift the data protection function from an operation state to a non-operation state. The second personal identification data includes authority to request inactivation of the data protection function and authority to request activation of the data protection function to shift the data protection function from the non-operation state to the operation state. The third personal identification data includes authority to establish a setting for prohibiting the data write and the data read to/from the area of the nonvolatile memory allocated as a user area and to cancel the setting. The personal identification data access controller is configured to control setting and acquisition of personal identification data by the host apparatus. The initialization processor is configured to execute an initialization process when inactivation of the data protection function is requested. The initialization process initializes at least the third personal identification data managed by the personal identification data manager except for the first personal identification data, invalidates the data on the nonvolatile memory, and shifts the data protection function to an inactive state. The authorization processor is configured to determine whether or not a command issued from the host apparatus is receivable based on personal identification data used for successful authentication. The authorization processor is configured to determine that a command requesting inactivation of the data protection function is receivable, when the first personal identification data is used for successful authentication, and determine that a command requesting setting of the first personal identification data is receivable, when the second personal identification data is used for successful authentication. The personal identification data access controller is configured to permit setting of the first personal identification data, when the second personal identification data is used for successful authentication and the first personal identification data is an initial value, or when the data protection function is in an inactive state, and prohibit acquisition of the first personal identification data even when any of the personal identification data is used for successful authentication.

Hereinafter, embodiments will be explained with reference to accompanying drawings.

First Embodiment

First embodiment will be described.

FIG. 1 is a diagram showing an example of the structure of a data storage apparatus 1 according to the first embodiment. The data storage apparatus 1 is a storage with a data protection function and may be realized as a solid state drive (SSD) or a hard disk drive (HDD). The data protection function is performed through various methods such as encrypting data for storage, locking an area allocated to a particular person from access by other individuals, and combination of encryption and locking. Any of such methods can be applied to the data storage apparatus 1. That is, the data storage apparatus 1 can be any type of data storage apparatus. As a standard of the data protection function, trusted computing group (TCG) or the like is available. As shown in FIG. 1, the data storage apparatus 1 includes a controller 11, nonvolatile memory 12, and nonvolatile memory 13.

The controller 11 is a processing circuit which receives a read/write command from a host device 2, and reads data requested by the host device 2 from the nonvolatile memory 13 or writes data transmitted from the host device 2 to the nonvolatile memory 13, using the nonvolatile memory 12 as a cache. Note that the nonvolatile memory 12 may be provided within the controller 11. That is, the nonvolatile memory 12 is optional. The nonvolatile memory 12 may be used as a load destination of a program from the nonvolatile memory 13 and a work area of the program other than as a cache.

If the data protection function is performed through encryption (including combination of encryption and locking), the controller 11 encrypts data with an encryption key when writing the data to the nonvolatile memory 13, and decrypts the encrypted data with the encryption key used for encryption when reading the data from the nonvolatile memory 13. The controller 11 can invalidate the data on the nonvolatile memory 13 at once, by updating the encryption key for invalidating. Update of the encryption key is performed by generating a random value and replacing the value of encryption key with the generated random value.

Furthermore, if the data protection function is not performed trough encryption, the controller 11 invalidates the data on the nonvolatile memory 13, by initializing a table which manages correlation between a logical address and a physical address (recognized by the host device 2) of the nonvolatile memory 13, or by writing a particular value or a random value to a designated area or the entirety of the nonvolatile memory 13.

Note that, in the TCG, as a standard to protect data by encryption, Opal is available, for example, and as a standard to protect data without encryption, Pyrite is available, for example.

The nonvolatile memory 12 is, for example, a dynamic RAM (DRAM). Furthermore, the nonvolatile memory 13 is, for example, a NAND flash memory or a hard disk.

The data storage apparatus 1 and the host device 2 are connected by a SCSI interface, ATA interface, NVM express (NVMe (registered trademark)), eMMC interface, and the like defined by TCG storage interface interactions specification (TCG SIIS). FIG. 1 shows an example where the data storage apparatus 1 and the host device 2 are connected by the NVMe (registered trademark) interface.

The host device 2 is a server or a personal computer using the data storage apparatus 1 as a storage. That is, the data storage apparatus 1 forms a data processing system with the host device 2. Furthermore, the host device 2 may be a device used for various settings of the data storage apparatus 1 by a drive vendor of the data storage apparatus 1, or may be a device used for various settings of the data storage apparatus 1 by a PC vendor which sells the server and the personal computer with the data storage apparatus 1 bought by the driver vendor, or may be a device used for various settings of the data storage apparatus 1 by an end user of the server of the personal computer. Operators of the host device 2 include an operator of drive vendor, operator of PC vendor, or end user. Furthermore, if the end user is a corporate, operators of the host device 2 may be roughly divided into special users (IT administrator) and general users.

FIG. 2 is a diagram showing an example of a functional block of the controller 11.

As shown in FIG. 2, the controller 11 includes an interface processor 111, authentication processor 112, PIN manager 113, authorization processor 114, PIN access controller 115, initialization processor 116, read/write access controller 117, and read/write processor 118.

In a particular area of the nonvolatile memory 13 (data storage unit) of FIG. 1, user data received from the host device 2 and a program to cause the controller 11 to execute various procedure. The program is partly or entirely loaded in the nonvolatile memory 12 (or a volatile memory provided with the controller 11 used as a cache) by a processor of the controller 11 when, for example, the data storage apparatus 1 is activated. The processor of the controller 11 executes the loaded program of the nonvolatile memory 12. That is, with the description of program, various processing units including the processing units of FIG. 2 can be structured in the controller 11.

The interface processor 111 communicates with the host device 2 using a protocol conforming to the NVMe (registered trademark) standard, for example. Specifically, the interface processer 111 receives a command issued from the host device 2 and transmits a result of the process corresponding to the command to the host device 2.

The authentication processor 112 authenticates an operator of the host device 2. Specifically, when a command requesting authentication is issued from the host device 2 and is received by the interface processor 111, the authentication processor 112 requests an input of PIN to the host device 2 side, and determines whether or not a PIN input matches any one of a PIN group managed by the PIN manager 113 for authentication. Note that the PIN may be added to the command requesting authentication. Furthermore, user data corresponding to the PIN may be added to the command requesting authentication. A result of authentication by the authentication processor 112 is notified to the host device 2 via the interface processor 111.

The PIN manager 113 manages the PIN group used for the authentication. FIG. 3 shows an example of PIN types managed by the PIN manager 113.

As shown in FIG. 3, the PIN manager 113 can manage six types of PINs of SID, Admin, User, PSID, LSID, and MSID wherein LSID (Logical SID: first personal identification data) is unique to the data storage apparatus 1 as denoted by symbol a1. That is, the PIN manager 113 of the data storage apparatus 1 is functionally enhanced to manage the LSID.

SID is a PIN which may be referred to as owner PIN having authorities to activate the data protection function, to perform initialization which invalidates the data and inactivates the data protection function, and to set SID PIN and LSID PIN which will be described later, for example.

Admin is a PIN which may be referred to as administrator PIN having authorities to set user PIN, to allocate setting authority of an area to a user, and to unlock access prohibition set by the user to the area allocated to him/her for prohibiting an access by a third party to the area, for example.

User is a PIN which may be referred to as user PIN having an authority to access to the area allocated to the user. Furthermore, User has an authority to lock the area allocated to the user for prohibiting an access by a third party and to unlock the area. As described above, Admin has an authority to unlock the area. There may be a plurality of Users or may be no User.

PSID is a PIN which may be referred to as label PIN only having an authority to perform initialization. PSID is, for example, prepared for a case where a PC used by a user A who retired is now given to user B by initializing the data storage apparatus 1 while the initialization is difficult since the data storage apparatus 1 is locked by the user A who is not available and an IT manager cannot recall SID PIN. In general, PSID is printed on a label added to a case of the data storage apparatus 1 (which is not exposed unless the PC case is opened). In such a case, the IC manager opens the PC case to refer to the label of the data storage apparatus 1 and acquires PSID PIN, specifically, succeeds the authentication by PSID to initialize the data storage apparatus 1. Furthermore, in a case where a commercial PC is used, such a PC is not warrantied once the PC case is opened in many cases, and thus, the initialization may be requested to a customer center of the PC vendor. Note that such PSID used as above is defined as a not-updatable PIN. PSID PIN is set by a special command which is unique to the drive vendor when the data storage apparatus 1 is manufactured, for example. Or, PSID PIN may be set when the aforementioned program is stored (installed) in a particular area of the nonvolatile memory 13. Furthermore, PSID PIN is optional and there may be a case where PSID PIN is not provided.

In recent years, data storage apparatuses 1 are manufactured to be smaller and smaller, and a space to which a label is added becomes difficult to secure. Furthermore, printing PSID PINs to labels added to mass-produced data storage apparatuses 1 without an error is a great work load for the drive vendors. Furthermore, if PSID having an authority to perform initialization is stolen by an invalid individual, data erase or the like may possibly be performed unintentionally by the user. Thus, LSID which is safer and more convenient as compared to PSID is introduced in the data storage apparatus 1 as a substitute to PSID. Note that the data storage apparatus 1 does not exclude PSID. That is, the data storage apparatus 1 maintains the functions related to PSID and also includes the functions related to LSID. In this embodiment, PSID PIN is not set to the data storage apparatus 1, that is, PSID PIN is not managed in the PIN manager 113.

As described above, LSID is a substitution PIN of PSID. That is, LSID has an authority to perform initialization of the data storage apparatus 1 as with the PSID. Furthermore, LSID is defined as a PIN which can be set under a certain condition. This will be described later.

MSID is a PIN having no authority and is defined to maintain an initial value of SID. In other words, SID PIN and MSID PIN are the same value if the data storage apparatus 1 is in an initial state. MSID is defined as a non-updatable PIN as with PSID, and the value thereof is set by a special command unique to the drive vendor when the data storage apparatus 1 is manufactured, for example. Or, MSID may be set when the aforementioned program is stored (installed) in a particular area of the nonvolatile memory 13. The initial value of SID PIN is set as with the MSID PIN. Furthermore, MSID is defined as a PIN which can be read without authentication. Although this will be described later, an end user who buys a PC initially reads MSID PIN and performs authentication using the value of the MSID PIN as SID to perform setting (update) of SID PIN and activation of data protection function. Furthermore, when the data protection function is activated by the authority of SID, setting of Admin PIN and User PIN can be performed.

The processing units of the controller 11 will be explained with reference to FIG. 2 again.

When a command is issued by the host device 2 and is received by the interface processor 111, the authorization processor 114 determines whether or not the command is received by checking if authentication is succeeded with the PIN to which an authority to issue the command is given. Specifically, when a command authority to issue of which is given to SID only is received from the interface processor 111, the authorization processor 114 determines whether or not the command is received by checking if the authentication processor 112 succeeds the authentication by SID PIN.

FIG. 4 shows commands related to LSID (PIN) and authorities to issue the commands in the data storage apparatus 1 of the present embodiment.

In FIG. 4, Activate is a command to activate the data protection function. A state where the data protection function is activated is referred to as Active. An authority to issue Active is given to SID. On the other hand, Revert is a command to inactivate the data protection function. A state where the data protection function is inactivated is referred to as Inactive. When the data protection function is inactivated, the data are invalidated. As described above, invalidation of data is performed by updating the encryption key if the data protection function is performed through encryption, and is performed by performing initialization of the table managing correlation between logical address and physical address or by writing a particular value or a random value to the entirety of the nonvolatile memory 13 if the data protection function is performed without encryption. That is, Revert is substantially a command to perform initialization. Furthermore, in the initialization, SID PIN managed by the PIN manager 113 returns to the same value as the MSID PIN which is an initial value. If User is set, the PIN value is erased. There is no concept of initialization for PSID which is defined as a non-updatable PIN. Furthermore, LSID PIN is maintained as a value at that time. An Inactive state may be referred to as original factory state (OFS). An authority to issue Revert is given to SID, PSID, and LSID which is denoted by symbol b1 (unique to the data storage apparatus 1). That is, the authorization processor 114 of the data storage apparatus 1 is enhanced to include a function to issue a Revert command with the LSID authority.

Set is a command to write (set) various setting values including PIN, and Get is a command to read (get) various setting values including PIN. An authority to issue Set and Get is defined depending on their targets (Objects). FIG. 5 shows an example of authorities of issuance when the targets (objects) of Set or Get are PIN.

An authority to issue a Set command to set a value of SID PIN is only given to SID and there is no Get command to obtain the value. An authority of issue a Set command to set a value of Admin PIN is only given to Admin and there is no Get command to obtain the value. An authority to issue a Set command to set a value of User PIN is only given to Admin or User and there is no Get command to obtain the value.

Since PSID PIN is defined as a non-updatable PIN as described above, there is no Set command to set the value. Furthermore, there is no Get command to obtain a value of PSID PIN. Note that, in this embodiment, the PIN manager 113 does not manage PSID PIN while the PIN access controller 115 which will be described later maintains a function for determining that a Set command or a Get command targeting PSID PIN is not receivable.

As to LSID PIN denoted by symbol c1 which is newly provided in the data storage apparatus 1 of the present embodiment, an authority to issue a Set command to set the value is only given to SID under a first condition or a second condition. There is no Get command to obtain the value of LSID PIN. The first condition is that LSID PIN is an initial value. The initial value of LSID PIN is, for example, set to a particular value such as High value (All F) which cannot be set by a Set command. The initial value of LSID PIN is, as with PSID PIN and MSID PIN, set by a special command which is unique to the drive vendor when the data storage apparatus 1 is manufactured. Or, the initial value may be set when the above-described program is stored (installed) in a particular area of the nonvolatile memory 13. Furthermore, the second condition is that the data protection function is in an inactive state, that is, Inactive.

Since MSID PIN is defined as a non-updatable PIN as described above, there is no Set command to set the value. On the other hand, a Get command to obtain the value of MSID PIN can be issued without authentication (to Anybody).

Whether or not a Set command or a Get command targeting PIN is received is determined by a PIN access controller 115 which will be described later. The authorization processor 114 transfers a Set command and a Get command targeting PIN to the PIN access controller 115 to have the PIN access controller 115 determine whether or not it is receivable.

The processing units of the controller 11 will further be explained with reference to FIG. 2 again.

The PIN access controller 115 controls PIN write (set) to the PIN manager 113 and PIN read (get) from the PIN manager 113. Specifically, when receiving a Set command of PIN from the authentication processor 114, the PIN access controller 115 checks whether or not authentication is succeeded with PIN having an authority to set the PIN and determines whether or not the command is receivable. If the command is determined to be receivable, the PIN access controller 115 sets the PIN to the PIN manager 113. When PIN is set, setting of the PIN is notified to the host device 2 via the interface processor 111. Similarly, when receiving a Get command of PIN from the authentication processor 114, the PIN access controller 115 checks whether or not authentication is succeeded with PIN having an authority to get the PIN, and obtains the PIN from the PIN manager 113 if the command is receivable. The PIN obtained is transferred to the host device 2 via the interface processor 111.

Furthermore, the PIN access controller 115 determines that a Get command of LSID PIN is not receivable even when authentication is succeeded with any PIN. On the other hand, as to a Set command of LSID PIN, the PIN access controller 115 firstly checks whether or not the authentication processor 112 succeeds authentication with SID PIN, checks whether or not LSID managed by the PIN manager 113 is an initial value, and determines that the Set command of the LSID PIN is receivable if the authentication is succeeded with the SID PIN and the LSID PIN is the initial value. The PIN access controller 115 updates LSID PIN managed by the PIN manager 113 to a value designated by the Set command, and notifies the update completion of the LSID PIN to the host device 2 via the interface processor 111.

Then, the PIN access controller 115 secondly checks whether or not the authentication processor 112 succeeds authentication with SID PIN, and checks whether or not it is in an Inactive state in which initialization is performed by a Revert command (by the initialization processor 116 which will be described later). If authentication is succeeded with PIN other than SID PIN, or if it is not in an Inactive state in which initialization is performed by a Revert command, the PIN access controller 115 determines that the Set command of the LSID PIN is not receivable and notifies that the Set command is not receivable to the host deice 2 via the interface processor 111. On the other hand, if authentication is succeeded with SID PIN, and if it is in an Inactive state after the initialization by a Revert command, the PIN access controller 115 determines that the Set command of the LSID PIN is receivable. The PIN access controller 115 updates LSID PIN managed by the PIN manager 113 to a value designated by the Set command, and notifies the update completion of the LSID PIN to the host device 2 via the interface processor 111.

That is, in the data storage apparatus 1, issuance of a Set command of LSID PIN is limited to the following two cases.

(1) Case where authentication is succeeded with SID PIN and LSID PIN is an initial value.

(2) Case where authentication is succeeded with SID PIN and initialization is performed with a Revert command.

That is, the PIN access controller 115 of the data storage apparatus 1 is enhanced to perform a function for accessing LSID PIN as an access to PIN managed by the PIN manager 113. Specifically, the PIN access controller 115 is enhanced to limit the access related to LSID PIN to the PIN manager 113 to the above cases (1) and (2). Superiority of LSID PIN which is a substitute PIN of PSID and access of which is controlled as above will be described later as compared to PSID PIN.

Furthermore, the PIN access controller 115 may be controlled to perform update of LSID PIN, that is, update of LSID PIN in a state where it has a value other than the initial value for only once. For example, the control can be performed by recording the number of updates of LSID PIN in a state where it has a value other than the initial value.

If a Revert command is issued and the Revert command is determined to be receivable by the authentication processor 114, the initialization processor 116 performs initialization to invalidate data and inactivate the data protection function. As described above, if authentication is succeeded with SID PIN, PSID PIN, or LSID PIN, the Revert command is determined to be receivable by the authentication processor 114 (cf. FIG. 4).

If a Read command or a Write command is issued, the read/write access controller 117 converts a logical address designated by the command to a physical address, and instructs the read/write processor 118 to perform data read or data write from/to the physical address, that is, data read/data write from/to the nonvolatile memory 13. The read/write access controller 117 can perform to lock or unlock an area of User corresponding to a command to lock or unlock the area from User to which the area is allocated. If a Read command or a Write command with respect to the area locked by a particular User is received, the read/write access controller 117 determines that the Read command or the Write command is not receivable, and notifies that the command is not receivable to the host device 2 via the interface processor 111. Note that, if a command to unlock is issued, the authorization processor 114 determines whether or not the command is receivable. Specifically, the authorization processor 114 determines that the command is receivable if authentication is succeeded with Admin PIN in addition to User PIN.

The read/write processor 118 performs data read/data write from/to the physical address designated by the read/write access controller 117, that is, data read/data write from/to the nonvolatile memory 13. A result of the access to the nonvolatile memory 13 is notified to the host device 2 via the interface processor 111. For example, when a Read command is issued, data read from the nonvolatile memory 13 is transmitted to the host device 2 via the interface processor 111, and when a Write command is issued, completion of data write to the nonvolatile memory 13 is notified to the host device 2 via the interface processor 111.

Now, an outline of transition of states of the data storage apparatus 1 including the data protection function will be explained with reference to FIG. 6.

For example, during shipment by the driver vendor, the data storage apparatus 1 is in an Inactive state where the data protection function is inactive. Furthermore, at that time, a value of SID PIN is the same as a value of MSID PIN. This is a state denoted by symbol S1 in FIG. 6.

Figure 6:
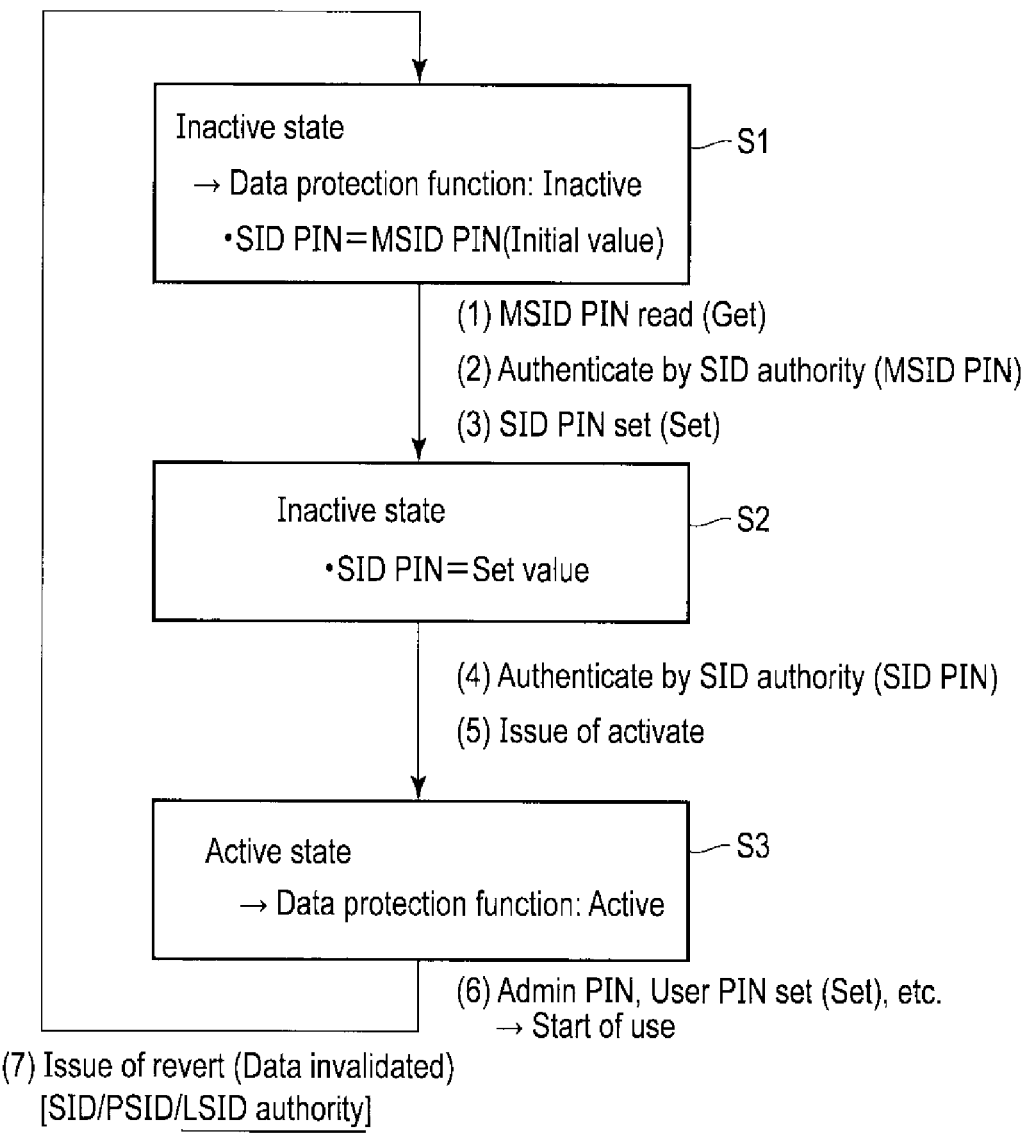
FIG. 6 is a diagram an outline of transition of states of the data storage apparatus according to the first embodiment.

Then, for example, a PC vendor which incorporates the data storage apparatus 1 in the state denoted by symbol S1 into a PC for delivery reads MSID PIN which can be obtained without authentication with Get command ((1) of FIG. 6), succeeds authentication by SID authority using the MSID PIN ((2) of FIG. 6), and sets a value of SID PIN with a Set command ((3) of FIG. 6). This is a state denoted by symbol S2 in FIG. 6. Here, the PC main body is the host device 2 of FIG. 1. Note that the value of SID PIN is not limited to a case of Inactive state and can be set in an Active state.

Then, for example, an IT manager of an end user (corporate) which buys the PC with the data storage apparatus 1 in the state denoted by symbol S2 succeeds authentication by SID authority with SID notified from the PC vendor ((4) of FIG. 6), and activates an Active data protection function with an Activate command ((5) of FIG. 6). This is a state denoted by symbol S3 of FIG. 6. When the data protection function is activated, that is, Shifting an Activate state, the IT manager performs, for example, setting (update) of Admin PIN, setting of User PIN, setting of User to which authority to set an area is assigned, and setting of activation of a lock function to the area ((6) of FIG. 6), and provides the PC with the data storage apparatus 1 in which above settings are performed and the lock function is activated with an employee. The employee succeeds authentication by User authority with User PIN notified from the IT manager to start using the PC with the data storage apparatus 1 data protection function of which is Active.

Furthermore, if authentication is succeeded with SID PIN, PSID PIN (which is not provided in this embodiment, or LSID PIN, a PC provided to an employee in a state denoted by symbol S3 can be returned to a state denoted by symbol S1 by a Revert command.

In consideration of the data storage apparatus 1 as above, a first use case of the data storage apparatus 1 focusing on LSID will be explained with reference to FIG. 7.

As shown in FIG. 7, this is a case where the data storage apparatus 1 delivered from a drive vendor 51 is incorporated in a PC 3 by a PC vendor 52, and the PC 3 with the data storage apparatus 1 is delivered to an end user 53 such as a corporate. In that case, the PC main body of the PC 3 with the data storage apparatus 1 corresponds to the host device 2 shown in FIG. 1. Furthermore, initialization of the data storage apparatus 1 incorporated in the PC 3 may be referred to as initialization of PC 3 in the following description.

Here, the drive vendor 51 delivers the data storage apparatus 1 having the data protection function in an Inactive state and LSID PIN with an initial value. That is, the drive vendor 51 does not perform management of LSID PIN which is a substitute PIN of PSID. Thus, the drive vendor 51 can reduce a process of managing PSID PIN for printing PSID PIN onto a label without an error.

On the other hand, the PC vendor 52 does not receive a value of LSID per data storage apparatus 1 from the drive vendor 51, and LSID PIN is an initial value, and thus, the PC vendor 52 can set a value of the LSID per PC 3 to which the data storage apparatus 1 is incorporated with a rule unique to the PC vendor 52 ((1) of FIG. 7). For example, different values may be assigned to PCs 3, or the same value may be assigned to the same model PCs 3. Furthermore, a value may be derived from a key or algorithm only known to the PC vendor and a serial number of the PC 3. In most cases, only the operators of the drive vendor 51 or the PC vendor 52 operate the data storage apparatus 1 having PSID PIN of initial value, and thus, setting (update) by an individual with a malicious intention while the LSID PIN is an initial value can be prevented. Note that the process of (1) of FIG. 7 may be performed by the host device 2 in the PC 3 with the data storage apparatus 1 or may be performed by a host device of PC 3 which is different from the host device 2.

In the end user 53 side buying the PC 3 from the PC vendor 52, an IT manager performs authentication by SID authority with MSID PIN, updates SID PIN, activates the data protection function of the data storage apparatus 1, sets Admin PIN, performs, with Admin authority, setting of User PIN, setting of User to which authority to set an area is assigned, setting of activation of lock function to the area, and provides the PC 3 with the data storage apparatus 1 in which the lock function is activated to an employee ((2) of FIG. 7).

Here, a case where a PC 3 which is given to an employee and is locked by the employee is now required to be initialized while User PIN is unclear since the employee is absent and an IT manager does not know Admin PIN or SID PIN is considered ((3) of FIG. 7). In that case, the end user (IT manager) 53 sends the PC 3 to the PC vendor 52 and requests initialization of the PC 3.

Upon receipt of the request, the PC vendor 52 can succeed authentication with LSID PIN set for the PC 3 to perform initialization to invalidate the data and to inactivate the data protection function to the PC 3 ((4) of FIG. 7) and return the initialized PC 3 to the end user ((5) of FIG. 7). Here, the important point is that the PC vendor 52 can manage LSID PIN. Since PSID PIN is generated by the drive vendor 51 and the value of PSID PIN is not changeable, the PC vendor 52 cannot set a value of PIN used for initialization of the PC 3 to an optional value. However, in the steps of the present embodiment, since the PC vendor 52 set LSID PIN, that is, PIN used for initialization of PC 3 in (1) of FIG. 7, the PC vendor 52 knows the value and can manage the value. Thus, the PC vendor 52 can initialize the PC 3 in (5) of FIG. 7 without inquiring the value to the drive vendor 51. Furthermore, as described above, only Admin and User have an authority of unlocking, and the data in the locked area cannot be read by LSID, and thus, the end user 53 can request the initialization without worrying data read of the data by the PC vendor 52. Note that the process (4) of FIG. 7 may be performed by the host device 2 in the PC 3 with the data storage apparatus 1, or may be performed by a host device other than the host device 2 of PC 3.

Note that, if the IT manager recalls SID PIN, the authentication is succeeded with SID PIN, and a Revert command is issued to initialize the PC 3. Furthermore, in the initialized state, LSID PIN can be set (updated) with SID authority. However, SID PIN is managed by an IT manager, and setting (update) of LSID PIN with SID authority is limited to an initialized state, and thus, setting (update) performed by an individual with malicious intent can be prevented. Furthermore, by defining a mode to prohibit update of LSID PIN which will be described later, a malicious act of wrongfully setting (update) LSID PIN to request a ransom otherwise erasing data with LSID can be prevented more securely.

Figure 8:
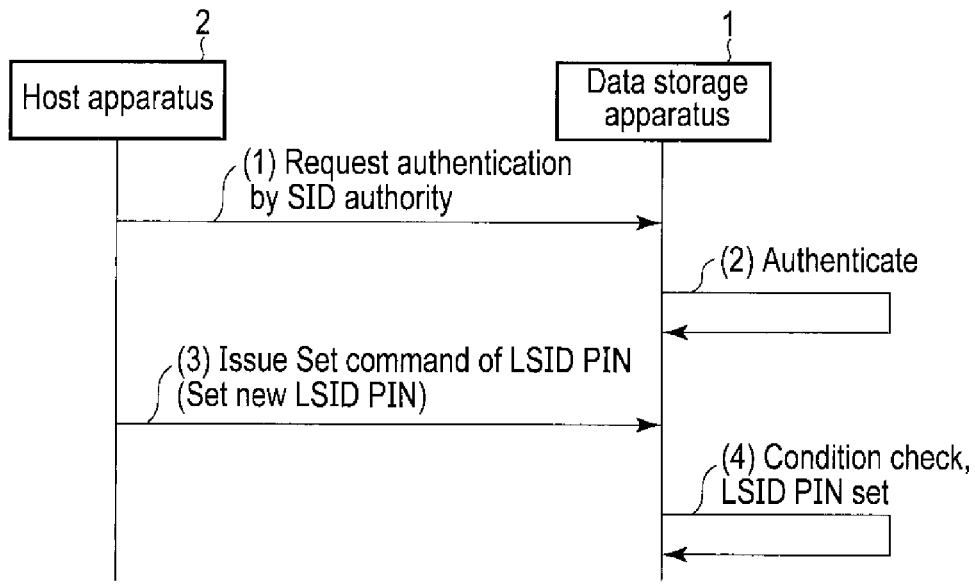
FIG. 8 is a diagram showing a sequence of communication between the host apparatus and the data storage apparatus in a case where LSID PIN is set (updated) while LSID PIN of the data storage apparatus according to the first embodiment is an initial value.

FIG. 8 is a diagram showing a sequence of communication between the host device 2 and the data storage apparatus 1 in a case where LSID PIN is set (updated) while LSID PIN is an initial value.

The host device 2 requests authentication by SID authority to the data storage apparatus 1 with SID PIN ((1) of FIG. 8). IF a value of SID PIN is correct, the data storage apparatus 1 succeeds the authentication ((2) of FIG. 8).

After the authentication is succeeded by SID authority, the host device 2 then issues a Set command of LSID PIN ((3) of FIG. 8). Upon receipt of the command, the data storage apparatus 1 checks if LSID PIN is an initial value, and if it is an initial value, sets (updates) LSID PIN to a value designated by the host device 2 ((4) of FIG. 8).

Figure 9:
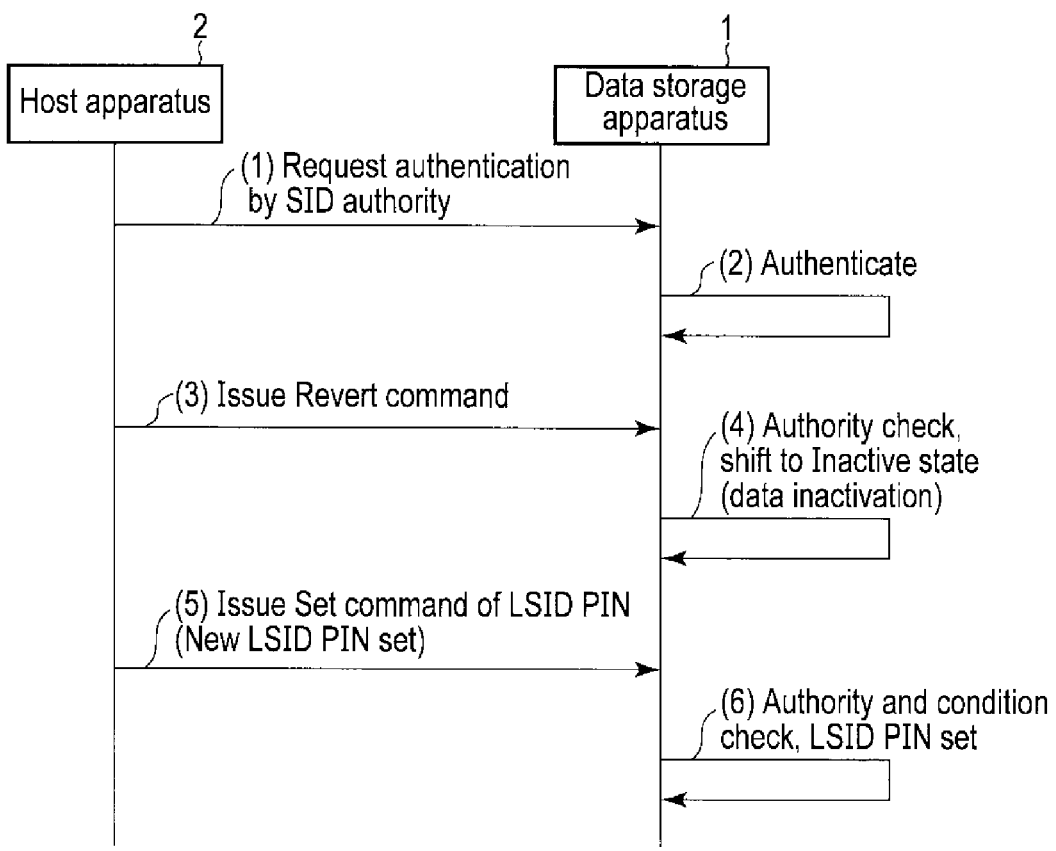
FIG. 9 is a diagram showing a sequence of communication between the host device and the data storage apparatus in a case where LSID PIN is set (updated) while the LSID PIN of the data storage apparatus according to the first embodiment is a value other than the initial value.

FIG. 9 is a diagram showing a sequence of communication between the host device 2 and the data storage apparatus 1 in a case where LSID PIN is set (updated) while LSID PIN is a value other than an initial value.

The host device 2 initially requests authentication by SID authority to the data storage apparatus 1 with SID PIN ((1) of FIG. 9). If the value of SID PIN is correct, the data storage apparatus 1 succeeds the authentication ((2) of FIG. 9).

After the authentication is succeeded by SID authority, the host device 2 then issues a Revert command ((3) of FIG. 9). Upon receipt of the command, the data storage apparatus 1 checks if the authentication is succeeded with PIN having an authority to issue a Revert command, and if it is succeeded, shifts the data protection function to an inactivate state (Inactive). That is, the host device 2 performs initialization with invalidation of data.

After the data protection function is inactivated, the host device 2 issues a Set command of LSID PIN ((5) of FIG. 9). Note that, preferably, the data storage apparatus 1, specifically, the PIN access controller 115 is made to set whether or not a Set command of LSID PIN is received if a Revert command is issued. Furthermore, the PIN access controller 115 may be made to receive a Set command of LSID PIN only when the LSID PIN is an initial value. That is, receiving a Set command of LSID if a Revert command is issued is not essential. Here, the PIN access controller 115 is made to receive a Set command of LSID PIN if a Revert command is issued. That is, setting of LSID after Revert is set to be optional. Upon receipt of the command, the data storage apparatus 1 checks if the authentication is succeeded by PIN having an authority to issue a Set command of LSID PIN and checks if the data protection function is in an inactive stat, and sets (updates) LSID PIN to a value designated by the host device 2 if the authentication is succeeded with PIN having an authority to issue a Set command of LSID PIN and the data protection function is in an inactive state ((6) of FIG. 9).

Furthermore, FIG. 10 is a diagram showing a sequence of communication between the host device 2 and the data storage apparatus 1 in a case where initialization is performed by LSID PIN.

The host device 2 requests authentication by an LSID authority to the data storage apparatus 1 with LSID PIN ((1) of FIG. 10). If LSID PIN is correct, the data storage apparatus 1 succeeds the authentication ((2) of FIG. 10).

After the authentication is succeeded by the LSID authority, the host device 2 issues a Revert command ((3) of FIG. 10). Upon receipt of the command, the data storage apparatus 1 checks if the authentication is succeeded by PIN having an authority to issue a Revert command, and if it is succeeded, shifts the data protection function to an inactive state (Inactivate). That is, the host device 2 performs initialization with invalidation of data ((4) of FIG. 10).

Figure 11:
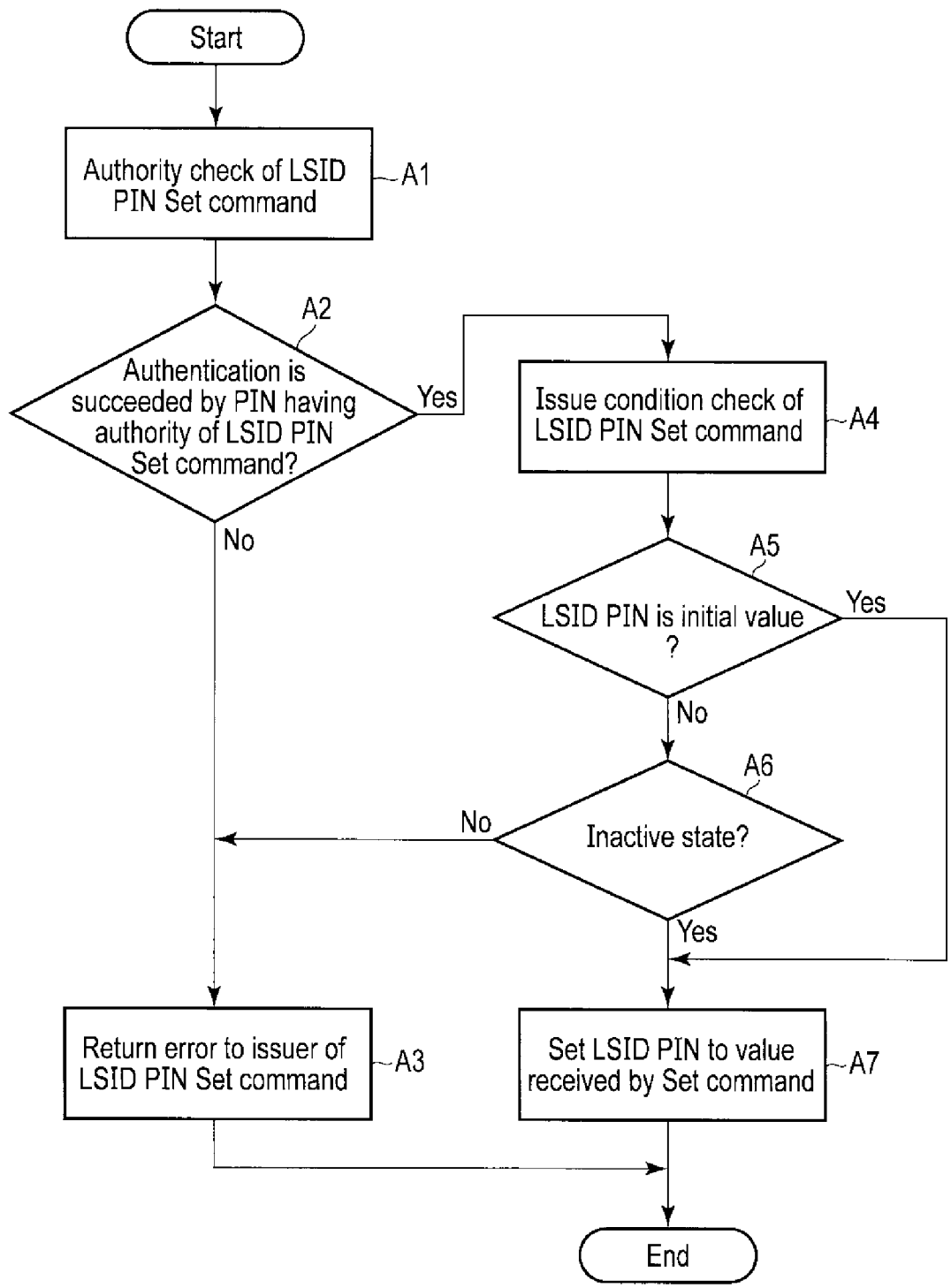
FIG. 11 is a flowchart showing an operation of the data storage apparatus when a Set command of LSID PIN of the data storage apparatus according to the first embodiment.

FIG. 11 is a flowchart showing operation of the data storage apparatus 1 when a Set command of LSID PIN is received.

Upon receipt of a Set command of LSID PIN, the data storage apparatus 1 checks an authority to issue a Set command of LSID PIN (step A1). Specifically, the data storage apparatus 1 checks whether or not the authentication is succeeded by PIN having an authority to issue a Set command of LSID PIN. If the authentication is succeeded by PIN not having an authority to issue the command (NO in step A2), the data storage apparatus 1 returns an error to the issuer of the command (step A3).

If the authentication is succeeded by PIN having an authority to issue a Set command of LSID PIN (YES in step A2), the data storage apparatus 1 then checks if a condition for issuing the command is satisfied (step A4). Specifically, whether or not LSID PIN is an initial value is checked (step A5). If it is an initial value (YES in step A5), the data storage apparatus 1 sets LSID PIN to a value received by the Set command (step A7). If LSID PIN is a value other than the initial value (NO in step A5), the data storage apparatus 1 then checks whether or not the data protection function is in an inactive state (step A6). If the data protection function is not in an inactive state (NO in step A6), the data storage apparatus 1 returns an error to the issuer of the command (step A3). If the data protection function is in an inactive state (YES in step A6), the data storage apparatus 1 set the LSID PIN to a value received by the Set command (step A7).

Figure 12:
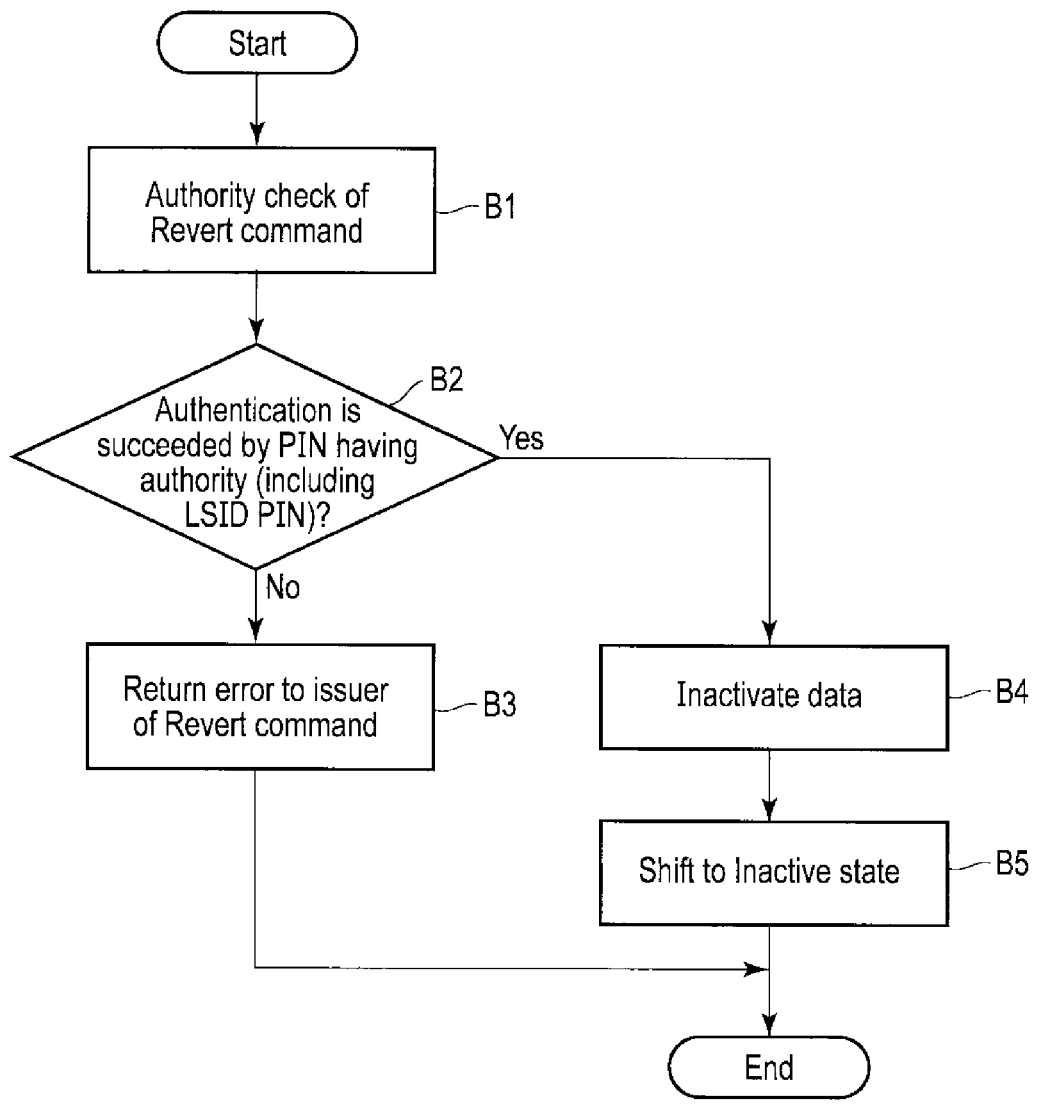
FIG. 12 is a flowchart showing an operation of the data storage apparatus according to the first embodiment when a Revert command is received.

FIG. 12 is a flowchart showing the operation of the data storage apparatus 1 when a Revert command is received.

Upon receipt of a Revert command, the data storage apparatus 1 checks an authority to issue a Revert command (step B1). Specifically, the data storage apparatus 1 checks whether or not the authentication is succeeded by PIN having an authority to issue a Revert command. If the authentication is succeeded by PIN not having an authority to issue the command (NO in step B2), the data storage apparatus 1 returns an error to the issuer of the command (step B3).

On the other hand, if the authentication is succeeded by PIN having an authority to issue a Revert command including LSID (YES in step B2), the data storage apparatus 1 invalidates data (step B4) and shifts the data protection function to an inactive state (step B5).

Figure 13:
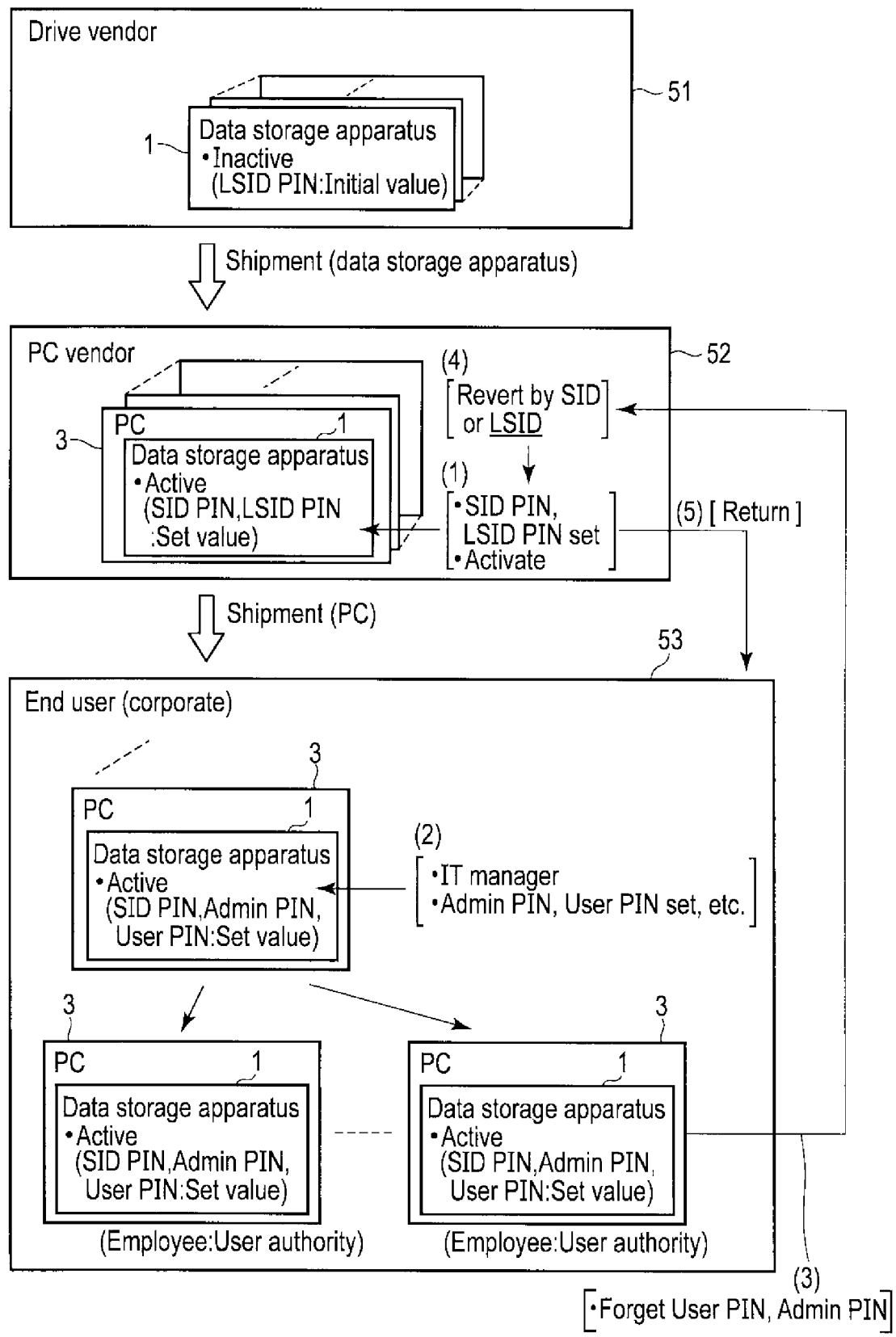
FIG. 13 is a diagram showing a second use case of the data storage apparatus according to the first embodiment.

FIG. 13 is a diagram showing a second use case of the data storage apparatus 1 focusing on LSID.

As in the first use case described above, a case where the data storage apparatus 1 delivered from the drive vendor 51 is incorporated into a PC 3 by the PC vendor 52 and (PC 3 with the data storage apparatus 1) is sent to the end user 53 such as a corporate is given for the second use case. In that case, the PC main body of the PC 3 with the data storage apparatus 1 corresponds to the host device 2 of FIG. 1.

Furthermore, in the second use case, the drive vendor 51 delivers the data storage apparatus 1 having a data protection function in an Inactive state and LSID PIN in an initial value. That is, the drive vendor 51 does not manage LSID PIN as a substitute PIN of PSID. Thus, in the second use case, the drive vendor 51 can cut a step of managing PSID PIN to print PSID PIN on a label without an error.

In the second use case, the PC vendor 52 manages SID PIN. Specifically, in addition to the setting of LSID PIN in the first use case, an operator of the PC vendor 52 succeeds authentication by an SID authority using MSID PIN, updates SID PIN, and activates the data protection function of the data storage apparatus 1 ((1) of FIG. 13). In the second use case, the end user 53 does not manage the SID PIN, with a suitable management of SID PIN by the PC vendor 52, stealing of SID PIN in the end user 53 side can be prevented. Note that, the process of (1) of FIG. 13 may be performed by the host device 2 in the PC 3 incorporated in the data storage apparatus 1, or may be performed by a host device other than the host device 2 in the PC 3.

On the other hand, in the end user 53 side as a buyer of the PC 3 from the PC vendor 52, an IT manager performs, for example, setting of Admin PIN, setting of User PIN, setting of User to which authority to set an area is assigned, and setting to activate a lock function to the area, and provides a PC including the data storage apparatus 1 with an activated lock function with an employee ((2) of FIG. 13).

Here, a case where a user locks the area assigned to him/her and forgets PIN (User), and an IT manger cannot recall Admin PIN in the end user 53 side as a buyer of the PC 3 from the PC vendor 52 ((3) of FIG. 13) is given. In that case, the end user 53 sends the PC 3 to the PC vendor 52 and requests initialization of the PC 3 (although the data will be lost).

Upon receipt of the request, the PC vendor 52 succeeds the authentication using SID PIN set for the PC 3 to perform the initialization of the PC 3, and succeeds the authentication using LSID PIN set for the PC 3 to perform initialization of the PC 3 ((4) of FIG. 13). After the initialization, the PC vendor 52 again performs setting of SID PIN and activation of the data protection function except for setting of LSID PIN ((1) of FIG. 13) and returns the PC 3 to the end user 53 ((5) of FIG. 13).

In the second use case, SID PIN is managed in the PC vendor 52 side, and thus, invalid update of LSID PIN can be prevented more securely. Note that the process (4) of FIG. 13 may be performed by the host device 2 in the PC 3 with the data storage apparatus 1 or may be performed by a host device other than the host device 2 in the PC 3.

Now, a third use case of the data storage apparatus 1 will be explained with reference to FIG. 7 used for the first use case.

In the first use case, a case where a PC 3 which is given to an employee and is locked by the employee is now required to be initialized while User PIN is unclear since the employee is absent and an IT manager does not know Admin PIN or SID PIN is considered ((3) of FIG. 7). In that case, the PC 3 is sent to the PC vendor 52 to request initialization of the PC 3.

In contrast, in the third use case, since the PC vendor 52 can determine and manage LSID PIN with a unique rule in the data storage apparatus 1 of the present embodiment, a case where an IT manager calls to a call center of the PC vendor 52 to inquire LSID PIN is given. In other words, a case where the PC vendor 52 provides service to receive an inquiry as to LSID PIN from the end user 53 is considered.

If the PC vendor 52 tries to reply such an inquiry in a conventional method (PSID PIN), the PC vendor 52 needs to read PSID PIN of the data storage apparatus 1 by eyesight or a barcode reader and prepare (input) database managed together with a serial number of the PC 3.

On the other hand, in the data storage apparatus 1 of the present embodiment, the PC vendor 52 can uniquely determine LSID PIN of the data storage apparatus 1 and a serial number of the PC 3, and thus, a work load for management can be significantly reduced.

Furthermore, in the third use case, the PC 3 is not handed to the PC vendor 52, and thus, the end user 53 is not worried about data read by the PC vendor 52.

Now, a fourth use case of the data storage apparatus 1 will be explained with reference to FIG. 13 used for explanation of the second use case.

In the second use case, if an area assigned to a user is locked and PIN (User) is forgot by the user, and an IT manager cannot recall Admin PIN ((3) of FIG. 13), the PC 3 is sent to the PC vendor 52 to request initialization of the PC 3.

In contrast, in the fourth use case, the PC 3 is not sent to the PC vendor 52, and the end user 53 opens the case of PC 3 to refer to a label of the data storage apparatus 1 applied to the case of the data storage apparatus 1 and obtains LSID PIN. Then, authentication is succeeded by LSID PIN, a Revert command is issued to perform initialization of the PC 3.

That is, LSID PIN of the present embodiment can be used as PSID PIN. Note that, when the case of the PC 3 is opened, the PC 3 is not warrantied in general. Thus, if the end user 53 opens the case of PC 3 to obtain LSID PIN and performs initialization of the PC 3, SID PIN is set and Activate command is issued in the end user 53 side for activation of the data protection function. Here, the PC 3 can be used without activation of the data protection function.

FIG. 14 is a diagram showing a fifth use case of the data storage apparatus 1 focusing on LSID.

As with the first to third use cases, a case where the data storage apparatus 1 delivered from the drive vendor 51 is incorporated into a PC 3 by the PC vendor 52 and (PC 3 with the data storage apparatus 1) is sent to the end user 53 such as a corporate is given for the fifth use case. In that case, the PC main body of the PC 3 with the data storage apparatus 1 corresponds to the host device 2 of FIG. 1.

Furthermore, in the fifth use case, the drive vendor 51 delivers the data storage apparatus 1 with the data protection function in an Inactive state and LSID PIN in an initial value. That is, the drive vendor 51 does not perform management of LSID which is a substitute PIN of PSID. Thus, in the fifth use case, the drive vendor 51 can reduce a step of managing PSID PIN to print PSID PIN on a label without an error.

In the fifth use case, instead of the PC vendor 52 adhering a label to the data storage apparatus 1 which is miniaturized such that a space to which the label is adhered is difficult to secure, the label is adhered to the PC main body side to which the data storage apparatus 1 is incorporated.

Here, if the PC vendor 52 prints PSID PIN of the data storage apparatus 1 to a label adhered to the PC main body side to which the data storage apparatus 1 is incorporated in a conventional method (PSID PIN), a work of the PC vendor 52 to print PSID PIN obtained from the drive vendor 51 to a label without an error becomes very complicate. In contrast, in the data storage apparatus 1 to which LSID as a substitute PIN of PSID, LSID PIN can be determined and set per PC 3 to which the data storage apparatus 1 is incorporated with a rule unique to the PC vendor 52 ((1) of FIG. 14), and thus, a work load of printing LSID PIN of the data storage apparatus 1 to the label adhered to the PC main body side can be significantly simplified ((2) of FIG. 14).

Specifically, in the conventional method (PSID), the PC vendor 52 must read PSID PIN of the data storage apparatus 1 by eyesight or a barcode reader, print PSID PIN to a label to be adhered to a PC main body, and adhere the label to the PC main body. On the other hand, in the data storage apparatus 1 of the present embodiment, the PC vendor 52 determines LSID PIN of the data storage apparatus 1, sets LSID PIN to a data storage apparatus 1, and prints LSID PIN to a label. As an equivalent work, in the PC vendor 52 side, a serial number of PC 3 is determined, set, and printed to a label on a PC 3. Since this process can be applied to PSID of the data storage apparatus 1, a significant increase of production costs is not required.

After the PC vendor 52 ships the PC 3, as in the first use case, for example, an IT manager in the end user 53 side performs authentication by an SID authority with MSID, updates SID and activates the data protection function of the data storage apparatus 1 to set Admin PIN, and performs setting of User PIN, setting of User to which an authority to set an area is assigned, and setting of activation of a lock function to the area. Then, the PC 3 with the data storage apparatus 1 with an activated lock function is provided with an employee ((3) of FIG. 14). Here, a case where the PC 3 which is given to an employee and is locked by the employee is now required to be initialized while User PIN is unclear since the employee is absent and an IT manager does not know Admin PIN or SID PIN is considered ((4) of FIG. 14).

In the fifth use case, if such a case occurs, the end user (IT manager) 53 refers to the label adhered to the main body of PC 3, acquires LSID PIN, and succeeds authentication with LSID PIN to perform initialization of the PC 3 ((5) of FIG. 14). Conventionally, a label to which PSID PIN is printed is adhered to the data storage apparatus 1, and thus, the case of PC 3 must be opened to obtain PSID PIN while, in the fifth use case in which LSID PIN is printed on a label adhered to the main body side of the PC 3, there is no necessity of opening the case of PC 3.

Note that, at the time of receiving the PC 3, preferably, the end user (IT manager) 53 notes LSID PIN and then peels the label to which LSID PIN is printed from the PC 3 to prevent a stranger from referring to and obtaining LSID PIN.

Furthermore, LSID PIN may not necessarily be printed on a label adhered to the PC 3. For example, the PC vendor 52 may enclose a print material (paper medium) such as a paper or a sticker to which LSID PIN is printed with a specification, and send the PC 3 to the end user 53. In the end user 53 side, an IT manager picks up the print material and provides the specification only to the employees.

Or, the PC vendor 52 may send a CD-ROM in which a list of correlation between LSID PINs and serial numbers of PCs 3 is recorded or a document of the list to the end user (IT manager) 53.

After the initialization, the end user (IT manager) 53 again performs setting of SID, activation of data protection function, setting of Admin PIN, and setting of User PIN ((3) of FIG. 14), and provides the PC 3 to an employee.

As can be understood from the above, the data storage apparatus 1 can handle personal identification data for initialization with high security and convenience.

Second Embodiment

Now, a second embodiment will be explained.

Figure 15:
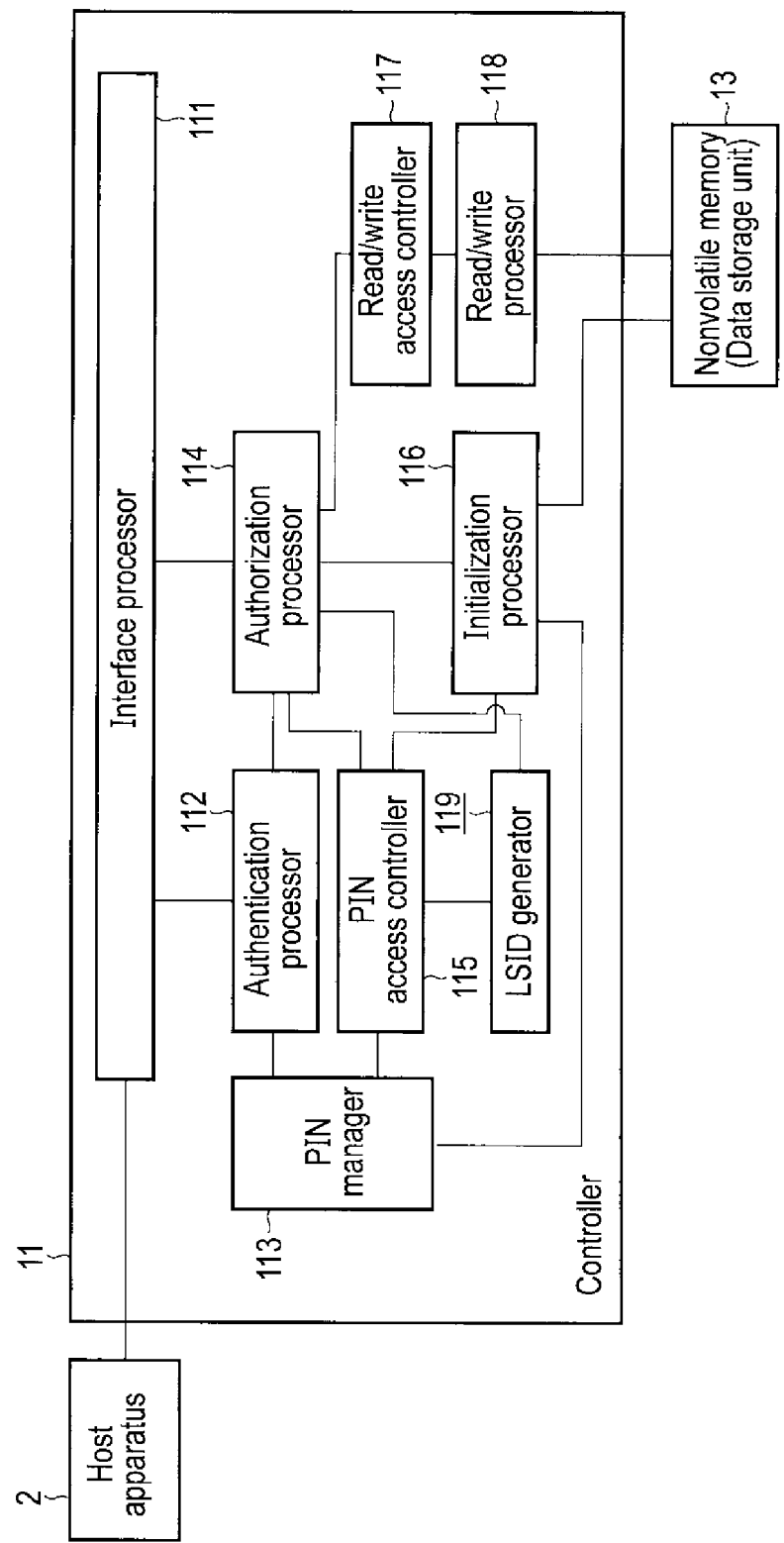
FIG. 15 is a diagram showing an example of a functional block of a controller of a data storage apparatus according to second embodiment.

FIG. 15 is a diagram showing an example of a functional block of a controller 11 of the second embodiment. Note that structural elements as in the first embodiment are referred to by the same reference numbers and the explanation considered redundant will be omitted.

In the first embodiment, there is no Get command to obtain LSID PIN while a Set command to set LSID PIN is issued by an SID authority if LSID PIN is an initial value. Furthermore, if LSID PIN is a value other than the initial value, a Set command is issued by an SID authority only when the data protection function is in an Inactive state. That is, in the first embodiment, LSID PIN can be set to a value designated by an issuer of the Set command.

In contrast, in the second embodiment, a command to update LSID PIN is received by an SID authority instead of a command to set LSID PIN, and upon receipt of the command, a value of LSID PIN is generated in the data storage apparatus 1 and set (updated). Furthermore, when LSID PIN is updated by the command, the data storage apparatus 1 receives a Get command to obtain LSID PIN (updated) for only once by an SID authority.

As shown in FIG. 15, the data storage apparatus 1 of the present embodiment further includes an LSID generator 119. The LSID generator 119 includes a function for generating a random number, for example, and generates a value of LSID with the function.

FIG. 16 shows an example of commands related to LSID and authorities to issue the commands in the data storage apparatus 1 of the present embodiment.

As shown in FIG. 16, in the data storage apparatus 1 of the present embodiment, an authority to issue a Revert command is given to LSID (symbol b1) and Gen_LSID denoted by symbol b2 is defined as a command related to LSID. Gen_LSID is a command to update LSID PIN, and an authority to issue thereof is given to SID.

Furthermore, FIG. 17 is a diagram showing an example of authorities to issue when a target (Object) of Set or Get is PIN in the data storage apparatus 1 of the present embodiment.

In the data storage apparatus 1 of the present embodiment, a Gen_LSID command is newly provided, and an authority to issue a Get command to obtain a value of LSID PIN (symbol c1) is given to SID under a certain condition as denoted by symbol c2. The certain condition means that the Get command is a first Get command after LSID PIN is updated by the Gen_LSID command. Furthermore, there is no Set command to set LSID PIN.

In the data storage apparatus 1 of the present embodiment, if a Gen_LSID command is issued from the host device 2 and is received by the interface processor 111, the authorization processor 114 determines whether or not the command is receivable by checking whether or not the authen-tication is succeeded by the authentication processor 112. If the authentication is succeeded by SID, the authorization processor 114 determines that the command is receivable, and then instructs execution of the process corresponding to the Gen_LSID command to a PIN access controller 115 and an LSID generator 119. Upon receipt of the instruction, the LSID generator 119 generates a value of LSID PIN with a function for generating a random number. Furthermore, the PIN access controller 115 of the data storage apparatus 1 of the present embodiment updates LSID PIN to the value generated by the LSID generator 119.

Furthermore, the PIN access controller 115 of the data storage apparatus 1 of the present embodiment determines, if a Get command targeting LSID PIN is issued from the host device 2 and received by the interface processor 111, whether or not the command is receivable. Specifically, the PIN access controller 115 determines whether or not the command is receivable by checking if the command is a first Get command after LSID PIN is updated by the issuance of Gen_LSID command. If the command is receivable, the PIN access controller 115 obtains LSID PIN from the PIN manager 113. LSID PIN obtained is sent to the host device 2 via the interface processor 111. The PIN access controller 115 manages a flag indicative of whether or not a Get command targeting LSID PIN is issued from the host device 2 after LSID PIN is updated by the issuance of Gen_LSID command.

Here a use case of the data storage apparatus 1 focusing on LSID will be explained with reference to the fourth use case (cf. FIG. 14) explained in the first embodiment.

For example, when printing LSID PIN of the data storage apparatus 1 on a label adhered to the PC main body side, an operator of the PC vendor 52 succeeds authentication by an SID authority with MSID PIN (wherein SID PIN of the data storage apparatus 1 shipped delivered from the drive vendor 51 is an initial value, that is, the same value as MSID PIN), and issues a Gen_LSID command. Thus, LSID PIN of the data storage apparatus 1 incorporated in the PC 3 is updated from the initial value to the value generated by the LSID generator 119.

Then, for example, the operator of the PC vendor 52 issues a Get command targeting LSID PIN to obtain LSID PIN. That is, since there is no need of obtaining LSID PIN from the drive vendor 51, a work load to print LSID PIN of the data storage apparatus 1 to a label adhered to the PC main body side can be significantly simplified in the data storage apparatus 1 of the present embodiment.

Specifically, in the conventional method (PSID), the PC vendor 52 must read PSID PIN of the data storage apparatus 1 by eyesight or a barcode reader, print PSID PIN to a label to be adhered to a PC main body, and adhere the label to the PC main body. On the other hand, in the data storage apparatus 1 of the present embodiment, the PC vendor 52 determines LSID PIN of the data storage apparatus 1, sets LSID PIN to a data storage apparatus 1, and prints LSID PIN to a label. As an equivalent work, in the PC vendor 52 side, a serial number of PC 3 is determined, set, and printed to a label on a PC 3. Since this process can be applied to PSID of the data storage apparatus 1, a significant increase of production costs is not required.

FIG. 18 is a diagram showing a sequence of communication between the host device and the data storage apparatus in a case where LSID PIN is updated.

The host device 2 requests authentication by SID authority to the data storage apparatus 1 with MSID PIN (if SID PIN is not updated) or SID PIN ((1) of FIG. 18). IF a value of the PIN is correct, the data storage apparatus 1 succeeds the authentication ((2) of FIG. 18).

If the authentication is succeeded by SID authority, the host device 2 issues a Gen_LSID command ((3) of FIG. 18). Upon receipt of the command, the data storage apparatus 1 checks if the authentication is succeeded by PIN having an authority to issue the Gen_LSID command, and if the authentication is succeeded so, generates an LSID value and sets the value to LSID PIN ((4) of FIG. 18).

After issuing the Gen_LSID command, the host device 2 then issues a Get command of LSID PIN. Upon receipt of the command, the data storage apparatus 1 checks if the authentication is succeeded by PIN having an authority to issue a Get command of LSID PIN and checks if the Get command is a first Get command of LSID PIN after the issuance of the Gen_LSID command. If the authentication is succeeded by PIN having an authority to issue a Get command of LSID PIN and the Get command is a first Get command of LSID PIN after the issuance of the Gen_LSID command, the data storage apparatus 1 reads LSID PIN (updated) and sends LSID PIN to the host device 2 ((6) of FIG. 18).

As can be understood from the above, the data storage apparatus 1 receives a Gen_LSID command, and if LSID PIN is updated, receives a Get command to obtain LSID PIN for only once by SID authority.

FIG. 19 is a flowchart showing the operation of the data storage apparatus 1 when a Gen_LSID command is received.

Upon receipt of a Gen_LSID command, the data storage apparatus 1 checks an authority to issue a Gen_LSID command (step C1). Specifically, the data storage apparatus 1 checks whether or not the authentication is succeeded by PIN having an authority to issue a Gen_LSID command. If the authentication is succeeded by PIN not having an authority to issue the command (NO in step C2), the data storage apparatus 1 returns an error to the issuer of the command (step C3).

If the authentication is succeeded by PIN having an authority to issue a Gen_LSID command (YES in step C3), the data storage apparatus 1 generates a value of LSID PIN and sets LSID PIN to the value (step C4).

Figure 20:
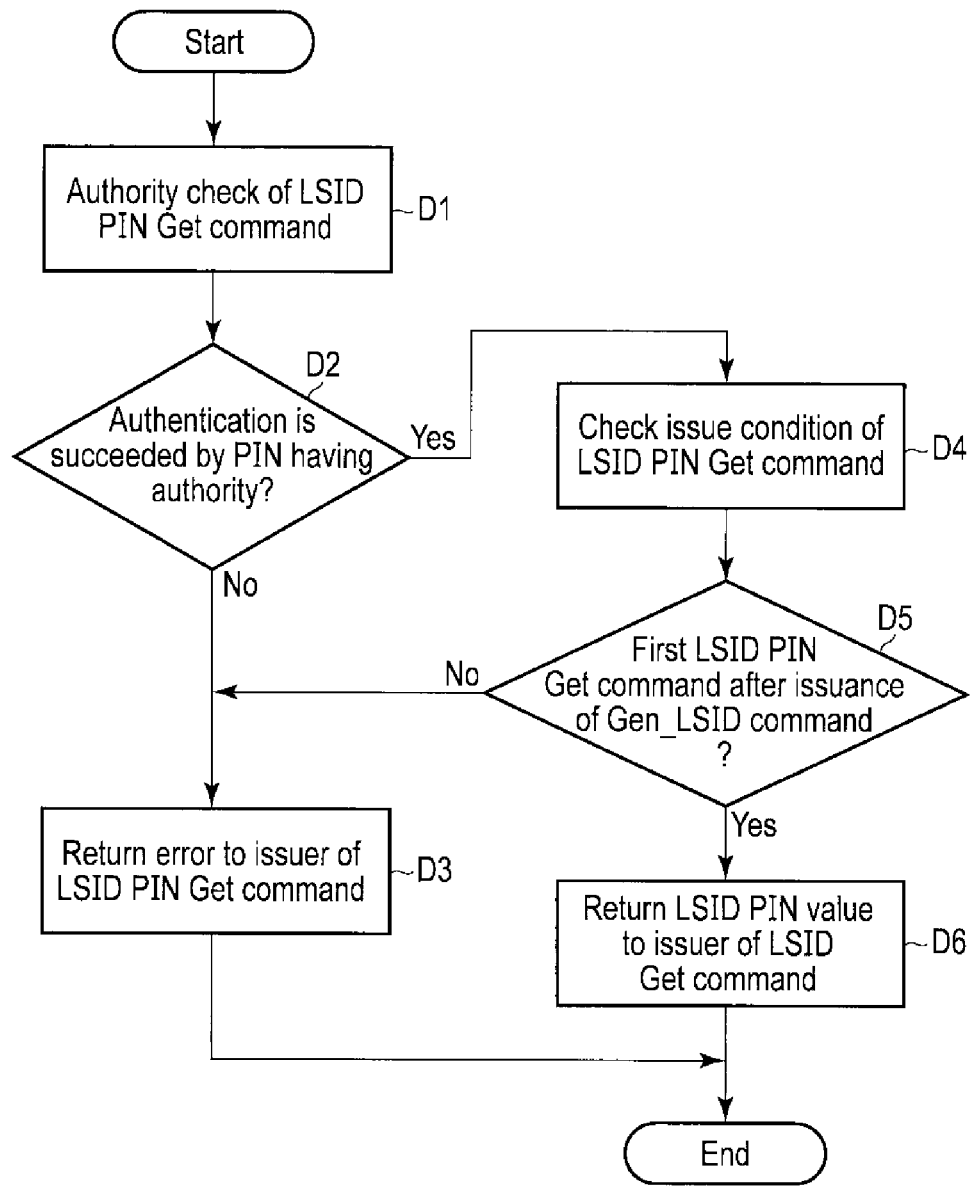
FIG. 20 is a flowchart showing an operation of the data storage apparatus of the second embodiment when a Get command of LSID PIN is received.

FIG. 20 is a flowchart showing the operation of the data storage apparatus 1 when a Get command of LSID PIN is received.

Upon receipt of a Get command of LSID, the data storage apparatus 1 checks an authority to issue a Get command (step D1). Specifically, the data storage apparatus 1 checks whether or not the authentication is succeeded by PIN having an authority to issue a Get command. If the authentication is succeeded by PIN not having an authority to issue the command (NO in step D2), the data storage apparatus 1 returns an error to the issuer of the command (step D3).

If the authentication is succeeded by PIN having an authority to issue a Get command of LSID PIN (YES in step D2), the data storage apparatus 1 then checks if a condition for issuing the command is satisfied (step D4). Specifically, whether or not the Get command is a first Get command of LSID after the Gen_LSID command is issued is checked. If it is not a first Get command of LSID PIN after the Gen_LSID command is issued (NO in step D5), the data storage apparatus 1 returns an error to the issuer of the command (step D3). If it is a first Get command of LSID PIN (YES in step D5), the data storage apparatus 1 reads LSID PIN (updated) and returns it to the host device 2 (step D6).

Note that checking of authority to issue in step D1 and checking of number of issuance of Get command of LSID PIN may not be performed in the order stated above.

As can be understood from the above, the data storage apparatus 1 of the present embodiment can handle personal identification data for initialization with high security and convenience.

Third Embodiment

Now, a third embodiment will be explained.

FIG. 21 is a diagram showing an example of a functional block of a controller 11 of the third embodiment. Note that structural elements as in the first and second embodiments are referred to by the same reference numbers and the explanation considered redundant will be omitted.

In the data storage apparatus 1 of the present embodiment, since an authority to issue an Activate command is only given to SID, a value of LSID PIN is sent to the data storage apparatus 1 as a parameter of the Activate command to set LSID PIN. For example, as in the second use case of the first embodiment (cf. FIG. 13), when the PC vendor 52 manages SID PIN and activates the data protection function of the data storage apparatus 1, a chance to issue the Activate command is limited in the PC vendor 52, and thus, update of LSID PIN is limited in the PC vendor 52. That is, wrongful update of LSID PIN can be prevented.

As shown in FIG. 21, the data storage apparatus 1 of the present embodiment further includes an Activate parameter processor 120. The Activate parameter processor 120 includes a function for updating LSID PIN managed by the PIN manager 113 to a value designated as a parameter of the Activate command.

FIG. 22 shows an example of commands related to LSID and authorities to issue the commands in the data storage apparatus 1 of the present embodiment.

As shown in FIG. 22, in the data storage apparatus 1 of the present embodiment, Activate (w/param) denoted by symbol b3 is defined as a command related to LSID. Here, (w/param) indicates addition of a parameter. That is, the data storage apparatus 1 of the present embodiment is enhanced to receive an Active command with a parameter.

Specifically, if an Activate command is issued from the host device 2, the authorization processor determines whether or not the command is receivable by checking if the authentication is succeeded by PIN having an authority to issue the command, and if the command is receivable and a parameter is added thereto, sends the value designated as the parameter to the Activate parameter processor 120. The Activate parameter processor 120 updates LSID PIN managed by the PIN manager 113 to the value sent from the authorization processor 114.

FIG. 23 is a diagram showing a sequence of communication between the host device and the data storage apparatus of the present embodiment in a case where LSID PIN is updated. Note that, in this example, the data storage apparatus 1 includes the data protection function in an inactive state (Inactive).

The host device 2 requests authentication by SID authority to the data storage apparatus 1 with SID PIN ((1) of FIG. 23). If a value of the PIN is correct, the data storage apparatus 1 succeeds the authentication ((2) of FIG. 23).

After the authentication is succeeded by SID authority, the host device 2 issues an Activate command to which a value to be set to LSID PIN is added as a parameter (Activate (w/param)) ((3) of FIG. 23). Upon receipt of the command, the data storage apparatus 1 checks if the authentication is succeeded by PIN having an authority to issue the Activate (w/param) command, and if the authentication is succeeded so, activates the data protection function (shifts to inactive) and sets the value designated as a parameter to LSID PIN ((4) of FIG. 23).

FIG. 24 is a flowchart showing the operation of the data storage apparatus 1 when an Activate (w/param) command is received.

Upon receipt of an Activate (w/param) command, the data storage apparatus 1 checks an authority to issue an Activate (w/param) command (step F1). Specifically, the data storage apparatus 1 checks whether or not the authentication is succeeded by PIN having an authority to issue an Activate (w/param) command. If the authentication is succeeded by PIN not having an authority to issue the command (NO in step F2), the data storage apparatus 1 returns an error to the issuer of the command (step F3).

If the authentication is succeeded by PIN having an authority to issue an Activate (w/param) command (YES in step F2), the data storage apparatus 1 activates the data protection function (step F4) and sets a value designated as a parameter to LSID PIN (step F5).

As can be understood from the above, the data storage apparatus 1 of the present embodiment can handle personal identification data for initialization with high security and convenience.

Fourth Embodiment

Now, a fourth embodiment will be explained.

Figure 25:
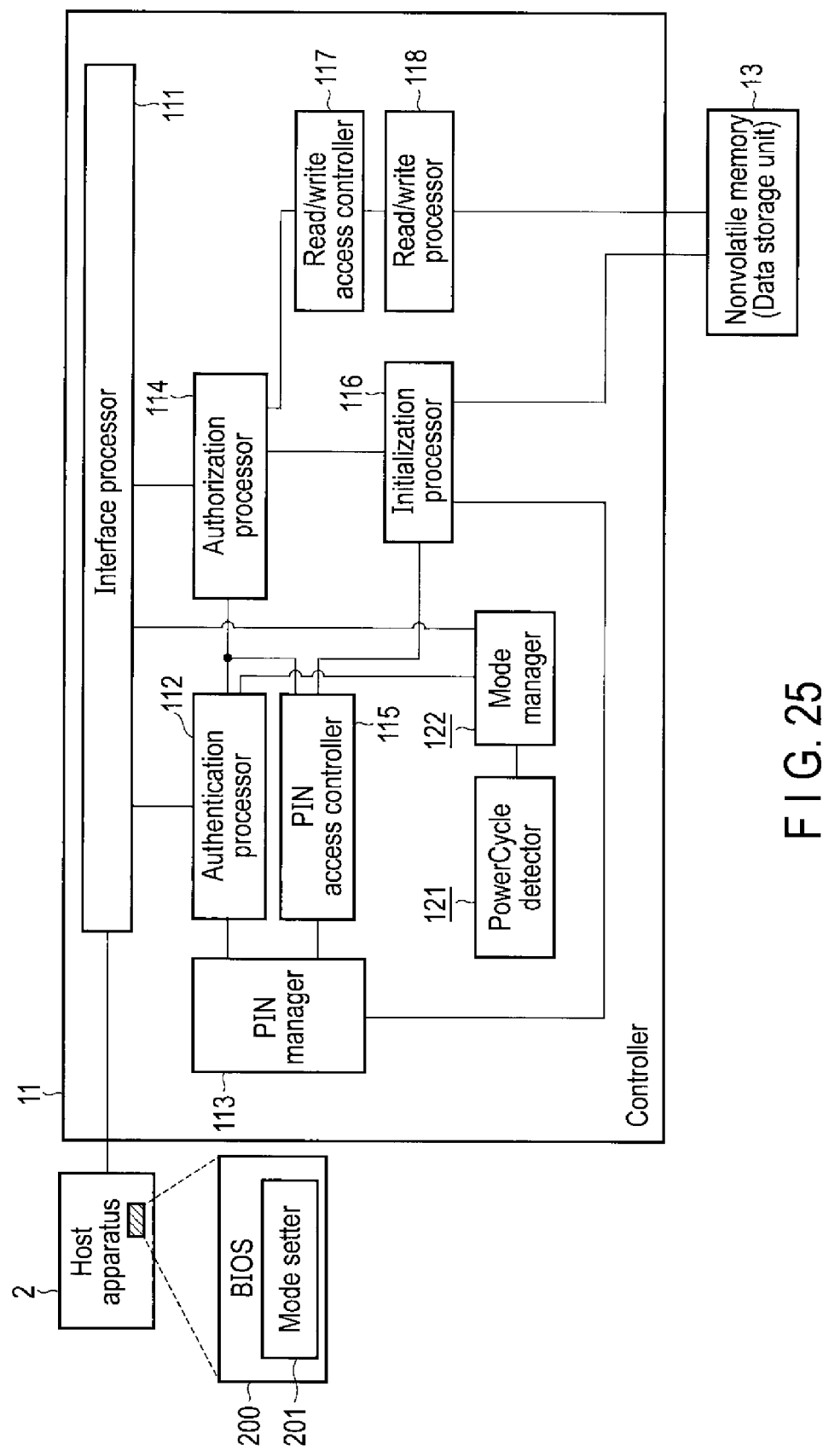
FIG. 25 is a diagram showing an example of a functional block of a controller of the data storage apparatus according to a fourth embodiment.

FIG. 25 is a diagram showing an example of a functional block of a controller 11 of the fourth embodiment. Note that structural elements as in the first to third embodiments are referred to by the same reference numbers and the explanation considered redundant will be omitted.

The data storage apparatus 1 of the present embodiment includes a mode in which update of LSID PIN is granted (LSID updatable mode) and a mode in which update of LSID is not granted (LSID non-updatable mode). Furthermore, a command to switch the modes is issued only by a basic input/output system (BIOS) 200 operative on the host device 2. BIOS 200 operative on the host device 2 includes a mode setter 201 which performs various settings of the data storage apparatus 1, and the mode setter 201 includes a function for issuing a command to switch between the LSID updatable mode and the LSID non-updatable mode. Furthermore, the mode setter 201 includes a function for controlling issuance of a Set command of LSID PIN.

As shown in FIG. 25, the data storage apparatus 1 of the present embodiment further includes a PowerCycle detector 121 and a mode manager 122. The PowerCycle detector 121 detects power on or reboot of the data storage apparatus 1, and notifies it to the mode manager 122. Upon receipt of the notification from the PowerCycle detector 121, the mode manager 122 sets the LSID updatable mode. Furthermore, if a command to switch to the LSID non-updatable mode is issued, the mode manager 122 sets the LSID non-updatable mode. When LSID PIN is set, a Set command of LSID PIN is issued by the mode setter 201 of BIOS 200 before issuing a command to switch to the LSID non-updatable mode.

In the data storage apparatus 1 of the present embodiment, LSID_mode_change is defined as a command related to LSID. LSID_mode_change is a command switching form the LSID updatable mode to the LSID non-updatable mode and is defined as a command issuable from BIOS 200. Note that the data storage apparatus 1 does not determine whether or not BIOS 200 issues the LSID_mode_change. Thus, being defined as a command issuable from BIOS 200 means that a function for issuing the command is only mounted to BIOS 200. In other words, the data storage apparatus 1 determines that the command is recievable without authentication (to Anybody).

Specifically, LSID_mode_change is a command in a layer where authority to issue thereof is not inquired, which is one level below a layer including commands such as Activate and Set where authority to issue thereof is inquired, and when receiving LSID_mode_change, the interface processor 111 notifies the receipt of LSID_mode_change to the mode manager 122. Upon receipt of the notification, the mode manager 122 performs switching form the LSID updatable mode to the LSID non-updatable mode. Furthermore, the mode manager 122 requests to the authentication processor 112 that the authentication by LSID PIN performed thereafter must fail even if the value thereof is correct. That is, in the data storage apparatus 1 of the present embodiment, issuance of Revert by LSID authority is performed by BIOS 200, or specifically, is performed before issuance of LSID_mode_change.

The PIN access controller 115 of the present embodiment inquires which of the LSID updatable mode and the LSID non-updatable mode is set to the mode manager 121 if a Set command targeting LSID PIN is issued. If the LSID non-updatable mode is set, receipt of the command is determined impossible even if the authentication is succeeded by PIN having an authority to issue a Set command targeting LSID.

FIG. 26 is a diagram showing a sequence of communication of first pattern between the host device and the data storage apparatus of the present embodiment in a case where LSID non-updatable mode is set.

At the time of power on or reboot, the host device 2, specifically, BIOS 200 requests a process at the time of power on or reboot to the data storage apparatus 1 ((1) of FIG. 26). With the request, the data storage apparatus 1 detects the power on or the reboot of the host device 2 and sets the LSID updatable mode ((2) of FIG. 26).

When LSID PIN is updated, the host device 2 (mode setter 201 of BIOS 200) issues a Set command of LSID PIN ((3) of FIG. 26). Upon receipt of the command, the data storage apparatus 1 sets (updates) LSID PIN to a value designated by the host device 2 ((4) of FIG. 26).

Lastly, the host device 2 (mode setter 201 of BIOS 200) issues an LSID_mode_change command ((5) of FIG. 26). Upon receipt of the LSID_mode_change command, the data storage apparatus 1 performs switching from the LSID updatable mode to the LSID non-updatable mode ((6) of FIG. 26).

Furthermore, FIG. 27 is a diagram showing a sequence of communication of second pattern between the host device and the data storage apparatus of the present embodiment in a case where LSID non-updatable mode is set.

At the time of power on or reboot, the host device 2, specifically, BIOS 200 requests a process at the time of power on or reboot to the data storage apparatus 1 ((1) of FIG. 27). With the request, the data storage apparatus 1 detects the power on or the reboot of the host device 2 and sets the LSID updatable mode ((2) of FIG. 27).

When LSID PIN is updated, the host device 2 (mode setter 201 of BIOS 200) issues a Set command of LSID PIN ((3) of FIG. 27). Upon receipt of the command, the data storage apparatus 1 sets (updates) LSID PIN to a value designated by the host device 2 ((4) of FIG. 27).

In the second pattern, after LSID PIN is updated, the mode setter 201 of BIOS 200 generates a reboot signal to reboot the host device 2 ((5) of FIG. 27). Thus, the host device 2, specifically, BIOS 200 again requests a process at the time of reboot to the data storage apparatus 1 ((1)' of FIG. 27). Furthermore, the data storage apparatus 1 then detects the reboot of host device 2 and the LSID updatable mode is set ((2)' of FIG. 27).

Then, the host device 2 (mode setter 201 of BIOS 200) issues an LSID_mode_change command ((5) of FIG. 27). Upon receipt of the LSID_mode_change command, the data storage apparatus 1 performs switching from the LSID updatable mode to the LSID non-updatable mode ((6) of FIG. 27).

That is, in the second pattern, as basic steps, the host device 2 requests a process at the time of power on or reboot to the data storage apparatus 1 ((1) of FIG. 27) and issues an LSID_mode_change command ((5) of FIG. 27). When LSID PIN is updated, reset is performed after the update of LSID PIN, and the data storage apparatus 1 is set to the LSID non-updatable mode through the above basic steps.

FIG. 28 is a flowchart showing the operation of the data storage apparatus 1 related to setting of LSID PIN.

Upon detection of the power on or the reboot of the host device 2 (step E1), the data storage apparatus 1 initially sets the LSID updatable mode (step E2). If the data storage apparatus 1 receives a Set command of LSID PIN while being in the LSID updatable mode (YES in step E3), the data storage apparatus 1 sets LSID PIN to a value received by the Set command (step E4). Furthermore, upon receipt of the LSID_mode_change command (YES in step E5), the data storage apparatus 1 performs switching from the LSID updatable mode to the LSID non-updatable mode (step E6). That is, the data storage apparatus 1 performs setting of LSID non-updatable mode.

In the present embodiment, a value of LSID PIN is set by the host device 2 with the Set command. This means that, if invalid application is installed in the host device 2, the value of LSID PIN may possibly be wrongfully set without authorization by a user. Here, in a general computer architecture, BIOS 200 is initially executed, and then, OS and application are executed in this order. In the present embodiment, BIOS 200 sets the data storage apparatus 1 to the LSID non-updatable mode by the LSID_mode_change command before execution of OS or application. Thus, even if invalid application is installed in the host device 2, invalid setting of the value of LSID PIN by the invalid application can be prevented.

As can be understood from the above, the data storage apparatus 1 of the present embodiment which can prohibit update of LSID can handle personal identification data for initialization with high security and convenience.

Fifth Embodiment

Now, a fifth embodiment will be explained.

FIG. 29 is a diagram showing an example of a functional block of a controller 11 of the fifth embodiment. Note that structural elements as in the first to fourth embodiments are referred to by the same reference numbers and the explanation considered redundant will be omitted.

Initially, a use case of the data storage apparatus 1 of the present embodiment (sixth use case) will be explained with reference to FIG. 30.

In, for example, the second use case of the first embodiment (cf. FIG. 13), the PC vendor 52 manages SID PIN and activates the data protection function of the data storage apparatus 1. In contrast, in the sixth use case, the PC vendor 52 further sets and manages Admin PIN ((1) of FIG. 30). Admin PIN set by the PC vendor 52 is notified to an IT manager of the end user 53, for example. Upon receipt of notification of Admin PIN, the IT manager performs setting of User PIN and provides a PC 3 to an employee ((2) of FIG. 30).

In the sixth use case, if the end user 53 forgets Admin PIN and initialization of PC 3 is requested to the PC vendor 52 ((3) of FIG. 30), since PC vendor 52 knows the Admin PIN, the lock of the area of the PC 3 may be unlocked by the PC vendor 52 by an Admin authority before the initialization process, and the data may possibly be referred. Thus, in the data storage apparatus 1 of the present embodiment includes a function for revoking an authority to unlock which is given to Admin in the activation of data protection function ((1) of FIG. 30: revoking unlock authority of Admin).

The explanation will be continued with reference to FIG. 29 again.

As shown in FIG. 29, the data storage apparatus 1 of the present embodiment further includes a PIN authority change processor 122. If an Activate command is issued and the data protection function is activated, the PIN authority change processor 122 instructs to the PIN access controller 115 to revoke an authority to unlock of Admin. The PIN access controller 115 notifies revoke of the authority to unlock of Admin to the PIN manager 113 and the authorization processor 114. Thereinafter, the authorization processor 114 determines that a command to unlock by Admin authority is not receivable.

FIG. 31 is a flowchart showing the operation of the data storage apparatus 1 when an Activate command is received.

Upon receipt of the Activate command, the data storage apparatus 1 checks an authority to issue an Activate command (step G1). Specifically, the data storage apparatus 1 checks if authentication is succeeded by PIN having an authority to issue an Activate command. If the authentication is succeeded by PIN not having an authority to issue the command (NO in step G2), the data storage apparatus 1 returns an error to the issuer of the command (step G3).

If the authentication is succeeded by PIN having an authority to issue the Activate command (YES in step G2), the data storage apparatus 1 activates the data protection function (step G4) and revokes the authority to unlock of Admin (step G5).

In the data storage apparatus 1 of the present embodiment, even if Admin PIN is set and managed by the PC vendor 52, the end user 53 can request initialization without worry since there is no possibility that data are read by the PC vendor 52.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing method of a data storage apparatus, the data storage apparatus including a data protection function for (A) prohibiting data write to and data read from an area on a nonvolatile memory allocated as a user area and for (B) invalidating data on the nonvolatile memory, the data processing method comprising:

managing first personal identification data, the first personal identification data including only authority to request inactivation of the data protection function such that the data on the nonvolatile memory be invalidated and the data protection function be shifted from an operation state to a non-operation state;

managing second personal identification data, the second personal identification data including authority to request inactivation of the data protection function and authority to request activation of the data protection function such that the data protection function be shifted from the non-operation state to the operation state;

managing third personal identification data, the third personal identification data including authority to establish a setting for prohibiting the data write to and the data read from the area on the nonvolatile memory allocated as the user area and authority to cancel the setting; and accepting a request of setting the first personal identification data, when authentication is successful using the second personal identification data, or when the data protection function is inactivated.

2. The data processing method according to claim 1, wherein
the request of setting the first personal identification data is accepted when the first personal identification data is an initial value.

3. The data processing method according to claim 1, further comprising:
revoking, from the third personal identification data, authority to cancel the setting for prohibiting the data write to and the data read from the area on the nonvolatile memory allocated as the user area, when the data protection function is activated.

4. A data storage apparatus comprising:
a nonvolatile memory; and
a controller configured to execute a data protection function for (A) prohibiting data write to and data read from an area on the nonvolatile memory allocated as a user area and for (B) invalidating data on the nonvolatile memory, wherein the controller is configured to:
manage first personal identification data, the first personal identification data including only authority to request inactivation of the data protection function such that the data on the nonvolatile memory be invalidated and the data protection function be shifted from an operation state to a non-operation state;
manage second personal identification data, the second personal identification data including authority to request inactivation of the data protection function and authority to request activation of the data protection function such that the data protection function be shifted from the non-operation state to the operation state;
manage third personal identification data, the third personal identification data including authority to establish a setting for prohibiting the data write to and the data read from the area on the nonvolatile memory allocated as the user area and authority to cancel the setting; and
accept a request of setting the first personal identification data, when authentication is successful using the second personal identification data, or when the data protection function is inactivated.

5. The data storage apparatus according to claim 4, wherein
the controller is configured to accept the request of setting the first personal identification data when the first personal identification data is an initial value.

6. The data storage apparatus according to claim 4, wherein
the controller is further configured to revoke, from the third personal identification data, authority to cancel the setting for prohibiting the data write to and the data read from the area on the nonvolatile memory allocated as the user area, when the data protection function is activated.

7. An information processing system comprising:
a host apparatus; and
a data storage apparatus connected with the host apparatus, the data storage apparatus including:
a nonvolatile memory; and
a controller configured to execute a data protection function for (A) prohibiting data write to and data read from an area on the nonvolatile memory allocated as a user area and for (B) invalidating data on the nonvolatile memory, wherein the controller is configured to:
manage first personal identification data, the first personal identification data including only authority to request inactivation of the data protection function such that the data on the nonvolatile memory be invalidated and the data protection function be shifted from an operation state to a non-operation state;
manage second personal identification data, the second personal identification data including authority to request inactivation of the data protection function and authority to request activation of the data protection function such that the data protection function be shifted from the non-operation state to the operation state;
manage third personal identification data, the third personal identification data including authority to establish a setting for prohibiting the data write to and the data read from the area on the nonvolatile memory allocated as the user area and authority to cancel the setting; and
accept a request of setting the first personal identification data from the host apparatus, when authentication with the host apparatus is successful using the second personal identification data, or when the data protection function is inactivated.

8. The information processing system according to claim 7, wherein
the controller is configured to accept the request of setting the first personal identification data when the first personal identification data is an initial value.

9. The information processing system according to claim 7, wherein
the controller is further configured to revoke, from the third personal identification data, authority to cancel the setting for prohibiting the data write to and the data read from the area on the nonvolatile memory allocated as the user area, when the data protection function is activated.

* * * * *